(12) United States Patent
Yanai et al.

(10) Patent No.: US 8,648,982 B2
(45) Date of Patent: Feb. 11, 2014

(54) OPTICAL FILM, POLARIZING PLATE AND LIQUID CRYSTAL DISPLAY DEVICE

(75) Inventors: Yujiro Yanai, Kanagawa (JP); Hiroaki Sata, Kanagawa (JP); Hajime Nakayama, Kanagawa (JP); Yasuyuki Sasada, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/579,776

(22) PCT Filed: Feb. 18, 2011

(86) PCT No.: PCT/JP2011/053578
§ 371 (c)(1), (2), (4) Date: Aug. 17, 2012

(87) PCT Pub. No.: WO2011/102492
PCT Pub. Date: Aug. 25, 2011

(65) Prior Publication Data
US 2012/0320316 A1 Dec. 20, 2012

(30) Foreign Application Priority Data
Feb. 19, 2010 (JP) ................. 2010-035462

(51) Int. Cl.
*G02F 1/1347* (2006.01)

(52) U.S. Cl.
USPC .......... 349/75; 349/96; 359/486.01; 428/220; 536/58; 156/246

(58) Field of Classification Search
USPC .......................... 349/96, 75; 359/4
See application file for complete search history.

(56) References Cited

U.S. PATENT DOCUMENTS

| | | | | |
|---|---|---|---|---|
| 5,327,285 A | * | 7/1994 | Faris | 359/486.02 |
| 2007/0231506 A1 | * | 10/2007 | Ohgaru et al. | 428/1.31 |
| 2008/0138540 A1 | * | 6/2008 | Omatsu | 428/1.1 |
| 2008/0246708 A1 | * | 10/2008 | Ishiguro | 345/87 |
| 2008/0291369 A1 | * | 11/2008 | Nagai et al. | 349/76 |
| 2009/0202751 A1 | * | 8/2009 | Sasada | 428/1.31 |
| 2010/0066948 A1 | * | 3/2010 | Hisakado et al. | 349/96 |
| 2010/0231830 A1 | * | 9/2010 | Hirakata et al. | 349/85 |

FOREIGN PATENT DOCUMENTS

| | | | | |
|---|---|---|---|---|
| JP | 10-153707 A | | 6/1998 | |
| JP | 10-160933 A | | 6/1998 | |
| JP | 10-161108 | * | 6/1998 | ............ G02F 1/1335 |
| JP | 10-161108 A | | 6/1998 | |
| JP | 2001-059949 A | | 3/2001 | |
| JP | 2002-301788 | * | 10/2002 | ............ B32B 23/08 |
| JP | 2002-301788 A | | 10/2002 | |
| JP | 2006-291186 | * | 10/2006 | ................ C08J 5/18 |
| JP | 2006-291186 A | | 10/2006 | |
| JP | 2007-264287 A | | 10/2007 | |

* cited by examiner

*Primary Examiner* — Edward Glick
*Assistant Examiner* — Sang V Nguyen
(74) *Attorney, Agent, or Firm* — Jean C. Edwards, Esq.; Edwards Neils PLLC

(57) ABSTRACT

There is provided an optical film having a small size change with a temperature change of a support of a pattern retardation film. An optical film includes: a support comprising a polymer having a moisture absorptivity of 0.5% or more; a first retardation region and a second retardation region, in which birefringence thereof is mutually different; and an optically anisotropic layer in which the first retardation region and the second retardation region are alternately patterned for every one line.

11 Claims, 1 Drawing Sheet

THIRD POLARIZING PLATE

SECOND POLARIZING PLATE

SUBSTRATE
LIQUID CRYSTAL LAYER
SUBSTRATE

FIRST POLARIZING PLATE

THIRD POLARIZING PLATE

SECOND POLARIZING PLATE

SUBSTRATE
LIQUID CRYSTAL LAYER
SUBSTRATE

FIRST POLARIZING PLATE

OPTICAL FILM, POLARIZING PLATE AND LIQUID CRYSTAL DISPLAY DEVICE

CROSS-REFERENCE TO RELATED APPLICATIONS

The present invention is a 35 U.S.C. 371 National Stage Entry of PCT/JP2011/053578, filed Feb. 18, 2011, which claims priority from Japanese Patent Application No. 2010-035462, filed on Feb. 19, 2010, the contents of which are herein incorporated by reference in their entirety.

TECHNICAL FIELD

The present invention relates to an optical film, a polarizing plate and a liquid crystal display device. More specifically, the present invention relates to a 2D/3D switchable image display panel and a 2D/3D switchable image display system, which may display stereoscopic images and 2-dimensional images, and a pattern retardation film used in the image display panel.

BACKGROUND ART

In the 3D stereoscopic image display field in which a projected image is stereoscopically viewed as if the image is emerging and a powerful image may be enjoyed, recently, as 3D movies have been rapidly adopted by the general public, the 3D stereoscopic image display on a flat panel display, which is a closer scene, is beginning to draw great attention. In the related art, various modes in which images are stereoscopically viewed by naked eyes, or various modes in which dedicated glasses for watching stereoscopic images are used have been known in the stereoscopic display, but, unlike the case of sitting in a cinema and having an appreciation of a 3D movie, from the viewpoint that images may be seen in a situation of movement in daily life, the mode in which dedicated glasses are used draws attention.

In the meantime, the contents of 3D images for flat panel displays have not been sufficient yet. For this reason, there is a need for an image display mode in which conversion between 2D display and 3D display is capable of being easily implemented, and both the 2D images and 3D stereoscopic images may also be displayed with high quality. As a mode meeting these needs, two modes such as a shutter glasses mode (active glasses mode) and a polarizing glasses mode (passive glasses mode) draw particular attention. Further, in the flat panel display field in which high definition has recently progressed, it has been currently thought that it is impossible to provide a high-quality 3D stereoscopic image while maintaining a high definition on a flat panel display in the related art by any mode other than these two modes. Among them, improvement in the polarizing glasses mode is further required from the viewpoint that it is possible to be widely disseminated at a relatively low cost.

In the polarizing glasses mode, an image for the left eye and an image for the right eye are displayed on a display, image light for the left eye and image light for the right eye, which are emitted from the display, are made into two different polarization states (for example, right circularly polarized light and left circularly polarized light), respectively, and the display is observed through polarized glasses comprised of a polarizing plate transmitting right circularly polarized light and a polarizing plate transmitting left circularly polarized light, thereby obtaining a stereoscopic effect (see Patent Document 1). In addition, as a method for displaying an image for the left eye and an image for the right eye on a display in the polarizing glasses mode, a screen division mode for displaying half of an original image on each of the half of the display, has been adopted for the image for the left eye and the image for the right eye. As the screen division mode, a line-by-line mode has been widely adopted, and this is a mode displaying, on every odd number line and even number line of scanning lines (hereinafter, also referred to as lines) of the display, respectively, a half of an image for the left eye with the number of pixels reduced to half of the original image for the left eye which corresponds to alternate lines of the original image for the left eye and a half of an image for the right eye with the number of pixels reduced to half of the original image for the right eye which corresponds to alternate lines of the original image for the right eye. Furthermore, as a method for making image light for the left eye and image light for the right eye, which are emitted from the display, into two different polarization states, respectively, a method for attaching a pattern retardation film in which different retardations are patterned in a repeating belt-like shape and disposed in response to a line width on the display has been widely adopted.

Recently, for a pattern retardation film in which different retardations are patterned in a repeating belt-like shape and disposed in response to a line width of the image display device, improvement and reduction in manufacturing costs have been further required for dissemination of 3D image display devices.

Herein, as a manufacturing method of the pattern retardation film, various methods are known (see Patent Documents 1 to 5).

Patent Document 1 discloses a preparation method, including: using, as a material, a polarizing film stacked with an unstretched cellulose triacetate (hereinafter, also referred to as TAC) film which does not have birefringence and a stretched polyvinyl alcohol (hereinafter, also referred to as PVA) film having a retardation function, which is treated with iodine, coating a photoresist on the polarizing film, exposing specific regions of the PVA film having a retardation function, and then treating the regions with a potassium hydroxide solution to eliminate the retardation function of a part of the regions.

Patent Document 2 similarly discloses a preparation method, including: using, as a material, a polarizing film stacked with an unstretched TAC film which does not have birefringence and a stretched PVA film treated with iodine, providing a resist member on specific regions of the PVA side of the polarizing film, and then dipping the polarizing film in hot water to eliminate the retardation function of a part of the regions, and the like.

Patent Document 3 discloses a method for using two sheets of polymer films having a retardation of 140 nm as a material. As an embodiment in the same document, there is disclosed a method for manufacturing an optical film having two different birefringence regions derived from two sheets of polymer films on a substrate, including: stacking a polysulfone film on the substrate as a first sheet of a retardation film, providing a resist on a partial region of the polysulfone film, performing etching to form some parts of the pattern, covering the substrate and the patterned polysulfone film with a polystyrene film as a second sheet of a retardation film, disposing the first sheet and the second sheet of the retardation films such that the slow axes thereof are perpendicular to each other, providing a resist only on a portion covering the substrate, and performing etching. Further, in paragraph 0043 of the same document, it is described that other polycarbonate, polysulfone, polyarylate, polyethersulfone, polyether ether ketone and the like may be used as the polymer film.

Patent Document 4 discloses a preparation method in which the chemical etching treatment in Patent Document 3 is changed to a physically cutting treatment with a dicer. In addition, in paragraph 0079 of Patent Document 4, examples of the retardation film material include an H polarizing film composed of a film produced by containing iodine, a dichromatic coloring matter, a pigment and the like in an uniaxially stretched film, a K polarizing film such as a uniaxially stretched polyvinylene film, a film containing a dichromatic coloring matter and the like in a uniaxially oriented polymer liquid crystal film, and the like.

Patent Document 5 discloses a method for using, as a material, a retardation film containing a photochromic compound (photoisomerization material) having a photoisomerizable functional group) and a polymer which interacts with the compound. In an embodiment of the same document, with respect to a pre-treated sheet containing polyethylene terephthalate and a photoisomerization material, a photomask having a light transmission portion and a light non-transmission portion patterned into desired shapes is superimposed with a polarizing plate for obtaining a linearly polarized light to first irradiate ultraviolet ray having a wavelength corresponding to the photoisomerization material from the top side thereof at the first time, and a polymer of the retardation film in the portion through which the ultraviolet ray is transmitted is oriented in the transmitted axis direction of the polarizing plate. Next, the photomask is moved such that the light transmitting portion and the light non-transmitting portion are opposed to the previous time, the transmission axis of the polarizing plate is rotated at 90°, and then, ultraviolet ray is irradiated at the second time. The polymer of the retardation film with a portion through which the ultraviolet ray was not transmitted previously is oriented in the transmitted axis direction of the polarizing plate rotated at 90°, as compared to the previous time. Furthermore, in the same document, examples of the polymer used include polymers polycondensed with hydroxyl carboxylic acid, aromatic carboxylic acid, aromatic diol and the like, or poly(meth)acrylic acid copolymer, and also, it is described that a polymerizable resin may be included.

RELATED ART DOCUMENTS

Patent Document

Patent Document 1: U.S. Pat. No. 5,327,285
Patent Document 2: Japanese Patent Application Laid-Open No. 2001-59949
Patent Document 3: Japanese Patent Application Laid-Open No. H10-161108
Patent Document 4: Japanese Patent Application Laid-Open No. H10-160933
Patent Document 5: Japanese Patent Application Laid-Open No. H10-153707

DISCLOSURE OF INVENTION

Problems to be Solved by the Invention

From the present inventors' review of Patent Documents 1 to 5, it is understood that methods for preparing a pattern retardation film composed of cellulose acylate or display performances, including the contents described or suggested in these documents, have not been well known so far. Patent Documents 1 and 2 describe a method for preparing a retardation film using a stacked body of a cellulose acylate-based TAC film and a PVA film, but, the TAC film is used as a protective film (support) which does not have birefringence, and a treatment has been performed only on the surface of the PVA film for the expression of birefringence and the elimination treatment of birefringence of some regions thereof. For this reason, these documents do not disclose nor suggest the means or spirit of eliminating birefringence of some portions of a TAC film used as a protective film, or do not disclose the expression of birefringence to the TAC film itself or the precision of forming a pattern.

In addition, there is dissatisfaction with the methods of Patent Documents 3 to 5, including: disposing the slow axes of two materials with different birefringence by transferring, for example, at 90°, and etching or physically cutting unnecessary portions after patterning, from the viewpoint of increasing material costs or complicating the manufacturing process.

Furthermore, it could be understood that any of the methods in Patent Documents 1 to 5 is not appropriate for the continuous film formation of a pattern retardation film and is an insufficient method, and requires to further reduce preparation costs.

Accordingly, there is dissatisfaction with pattern retardation films having regions having different birefringence from each other, which have been known so far, from the viewpoint of preparation costs.

Further, when a pattern retardation film having regions having different birefringence from each other is fabricated on a polymer film, it was apparent that in a 3D display device, a crosstalk was viewed, which is generated by a misalignment occurring with lapse of time to a patterning interval and pixels after a panel was turned ON. Moreover, the present inventors have intensively studied and found out that this phenomenon is due to a change in dimension of the polymer film as the temperature of the panel increases. It could be understood that the change in dimension of the polymer film causes the change in the slow axis direction of a patterning retardation composed of a coating layer, and thus, a 3D display performance is deteriorated by the crosstalk phenomenon.

Therefore, an object of the present invention is to solve these problems. That is, the problem to be solved by the present invention is to provide an optical film with a small change in dimension according to the change in temperature of a support of a pattern retardation film.

Specifically, it is preferred that the balance between a coefficient of thermal expansion and a humidity expansion coefficient is adjusted and offset by controlling the moisture absorptivity of a polymer, controlling the type and amount of additives and/or controlling the orientation state of the polymer.

On one hand, if the coefficient of thermal expansion and the humidity expansion coefficient are to be reduced, problems such as deterioration in transparency and brittleness, increase in specific weight and the like occur. Therefore, in order to suppress the occurrence of these problems and maintain the change in dimension according to the change in temperature at a low level, it is preferred that the balance between the coefficient of thermal expansion and the humidity expansion coefficient is adjusted as described above.

Means for Solving the Problems

The present inventors have intensively studied to solve the above-mentioned problems, and as a result, found that the change in dimension in a specific direction may be suppressed by stretching a film composed of cellulose acylate in one direction, and reducing the coefficient of thermal expansion and the humidity expansion coefficient in one direction The above-mentioned problems may be solved by the following means.

(1) An optical film comprising:
a support containing a polymer having a moisture absorptivity of 0.5% or more; and
an optically anisotropic layer including a first retardation region and a second retardation region that have different birefringence from each other and that are alternately patterned for every one line.

(2) The optical film according to the above (1), wherein the polymer is a polymer having a chemical structure selected from a hydroxyl group, amide, imide and ester in a main chain or side chain thereof.

(3) The optical film according to the above (1) or (2), wherein the polymer is cellulose ester.

(4) The optical film according to any one of the above (1) to (3), wherein a direction of a long side of the pattern is approximately perpendicular to a direction in which a sound velocity of the support is the maximum.

(5) The optical film according to any one of the above (1) to (4), wherein a coefficient of thermal expansion α ranges from $5.0 \times 10^{-6}/°C$ to $500 \times 10^{-6}/°C$ and a humidity expansion coefficient β ranges from $3.0 \times 10^{-6}/\%RH$ to $500 \times 10^{-6}/\%RH$, in a direction parallel to a direction in which a sound velocity of the support is the maximum.

(6) The optical film according to the above (5), wherein an elastic modulus (E1) of the direction in which the sound velocity is the maximum ranges from 5 GPa to 50 GPa.

(7) The optical film according to any one of the above (1) to (6), wherein the support is stretched by 10% or more.

(8) The optical film according to the above (7), wherein the support is a support in which a stretching in a conveying direction, a stretching in a direction which does not match the conveying direction, or a stretching in combination thereof is performed.

(9) The optical film of any one of the above (1) to (8), wherein the support satisfies the following equation (I):

$$|Re(550)|<5 \text{ and } |Rth(550)|<20 \qquad \text{Equation (I)}$$

wherein Re (λ) and Rth (λ) represent retardation values (unit: nm) in an in-plane direction and a film thickness direction at a wavelength of λ (unit: nm), respectively.

(10) The optical film according to any one of the above (1) to (9), wherein an entire Re (550) of the patterned optically anisotropic layer and the support ranges from 110 nm to 165 nm, and a slow axis of the first retardation region is approximately perpendicular to a slow axis of the second retardation region.

(11) A polarizing plate comprising:
an optical film according to any one of the above (1) to (10); and
a polarizer,
wherein the optical film and the polarizer are stacked through an adhesive layer.

(12) A liquid crystal display device comprising:
a pair of substrates having an electrode on at least one side thereof and disposed to face each other;
a liquid crystal layer between the pair of substrates; and
a first polarizing plate disposed on the side of a light source and a second polarizing plate disposed on a side of visual which interpose the liquid crystal layer therebetween, each including a polarizer and a protective film provided at least on an external side of the polarizer, a protective film provided at least on an external side of the polarizer,
an image being visually recognized through a third polarizing plate that includes a polarizer and at least one protective film on the visual side of the second polarizing plate,
wherein a polarizing plate according to the above (11) is the second polarizing plate.

Effects of the Invention

According to the present invention, it is possible to provide an optical film with a small change in dimension according to the change in temperature of a support of a pattern retardation film. In particular, in a 3D switchable image display panel, when an optical film having a first retardation region and a second retardation region is applied, in which birefringence is different from each other, and in which the first retardation region and the second retardation region are alternately patterned for every one line, the occurrence of contraction in a direction perpendicular to the pattern produces a misalignment between images of the panel, which is responsible for the crosstalk. However, it is possible to effectively prevent the phenomenon in the present invention.

BRIEF DESCRIPTION OF DRAWINGS

FIG. 1 is a schematic cross-sectional view showing an example of a liquid crystal display device.

EMBODIMENTS FOR CARRYING OUT THE INVENTION

Hereinafter, embodiments of the present invention will be described in detail. The description of constituent elements described hereinafter may be made based on a representative embodiment of the present invention, but the present invention is not limited to such an embodiment. Further, in the present specification, "to" is used to mean that numerical values described before and after the term are included as a lower limit and an upper limit. In addition, in the present specification, the inversion of the slow axis or the axis inversion refers to rotation of the slow axis at about 90° with respect to the original direction.

In the present specification, "parallel" and "perpendicular" mean a range within an exact angle less than ±10°. For the range, an error with the exact angle is preferably less than ±5° and more preferably less than ±2°. In addition, "substantially perpendicular" means a range within an angle of the exact vertical angle less than ±20°. For the range, an error with the exact angle is preferably less than ±15° and more preferably less than ±10°. Furthermore, "slow axis" means the direction in which the refractive index becomes the maximum. Further, the wavelength at which the refractive index is measured is a value in the visible region with λ=550 nm unless otherwise particularly described.

In the present specification, "polarizing plate" is used as a meaning including both a long polarizing plate and a polarizing plate cut (in the present invention, "cut" includes "punched", "cut out" and the like) to a size which enables the polarizing plate to be inserted into a liquid crystal display device, unless otherwise particularly rejected. In addition, in the present specification, the "polarizer" and "polarizing plate" are used as different meanings, but the "polarizing plate" means a laminated body having a transparent protective film at least on one side of a "polarizer" to protect the polarizer.

In the present description, Re (λ) and Rth (λ) represent an in-plane retardation and a retardation in a thickness-direction, respectively at a wavelength of λ. Re (λ) is measured by irradiating with an incident light with a wavelength of λ nm in the normal direction of a film using KOBRA 21ADH or WR (manufactured by Oji Scientific Instruments Co., Ltd.).

When a film to be measured is represented by a uniaxial or biaxial refractive index ellipsoid, Rth (λ) is calculated by the following method.

A total of six points of the Re (λ) are measured by irradiating with an incident light with a wavelength of λ nm from each of the inclined directions at an angle increasing in 10° step increments up to 50° in one direction from the normal direction with respect to the normal direction of the film by using the in-plane slow axis (decided by KOBRA 21ADH or WR) as an inclined axis (rotation axis) (when there is no slow axis, any in-plane direction of the film is used as a rotation axis), and then Rth (λ) is calculated by KOBRA 21ADH or WR based on the retardation value measured, a hypothetical value of an average refractive index, and an inputted film thickness value.

In the above, in the case of a film having a direction in which a retardation value is zero at a certain inclined angle with the in-plane slow axis from the normal direction being a rotation axis, a retardation value at an inclined angle larger than the inclined angle is changed into a sign of a negative value and then calculated by KOBRA 21ADH or WR.

Furthermore, with the slow axis as an inclined axis (rotation axis) (when there is no slow axis, any in-plane direction of the film is used as a rotation axis), retardation values may be measured from any two inclined directions and Rth may be calculated from the following equations (A) and (B) based on the values, a hypothetical value of an average refractive index and an inputted film thickness value.

$$Re(\theta) = \left[ nx - \frac{(ny \times nz)}{\left( \sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2} \right)} \right] \times \frac{d}{\cos\left\{\sin^{-1}\left(\frac{\sin(\theta)}{nx}\right)\right\}} \quad \text{Equation (A)}$$

The above-described Re (θ) represents a retardation value in a direction inclined at an angle (θ) from the normal direction.

In Equation (A), nx represents a refractive index in an in-plane slow axis direction, ny represents a refractive index in an in-plane direction perpendicular to nx, and nz represents a refractive index in a direction perpendicular to nx and ny. d is a film thickness.

$$Rth = ((nx+ny)/2-nz) \times d \quad \text{Equation (B)}$$

In Equation (B), nx represents a refractive index in an in-plane slow axis direction, ny represents a refractive index in an in-plane direction perpendicular to nx, and nz represents a refractive index in a direction perpendicular to nx and ny. d is a film thickness.

In the case where a film to be measured may not be represented by a uniaxial or biaxial refractive index ellipsoid, a so-called film having no optic axis, Rth (λ) is calculated by the following method.

Eleven points of the Re (λ) are measured by irradiating with an incident light at a wavelength of λ nm from each of the inclined directions at an angle increasing in 10° step increments from −50° to +50° with respect to the normal direction of the film by using the in-plane slow axis (decided by KOBRA 21ADH or WR) as an inclined axis (rotation axis), and then Rth (λ) is calculated by KOBRA 21ADH or WR based on the retardation value measured, a hypothetical value of an average refractive index, and an inputted film thickness value.

In the above-described measurements, the values described in Polymer Handbook (John Wiley & Sons, Inc.) and catalogues of various optical films may be used as the hypothetical value of the average refractive index. The average refractive index of which value is not already known may be measured by an Abbe refractometer. The values of average refractive index of main optical films are illustrated as follows: Cellulose acylate (1.48), cycloolefin polymer (1.52), polycarbonate (1.59), polymethyl methacrylate (1.49) and polystyrene (1.59).

By inputting these hypothetical values of an average refractive index and the film thickness, KOBRA 21ADH or WR calculates nx, ny and nz.

Further, in the present specification, the measurement wavelength is 550 nm unless otherwise particularly rejected.

(Optical Film)

An optical film of the present invention (hereinafter, also referred to as film of the present invention) includes: a support including a polymer having a moisture absorptivity of 0.5% or more; and an optically anisotropic layer (hereinafter, also referred to as pattern retardation layer) having a first retardation region and a second retardation region, having different birefringence from each other, in which the first retardation region and the second retardation region are alternately patterned for every one line.

Hereinafter, the film of the present invention will be described.

[Support]

A support of an optical material of the present invention is not particularly limited, but a support having a moisture absorptivity of 0.5% or more is preferred. In particular, when used for a 3D display of a circularly polarized light or linearly polarized light glasses mode, the support has a patterning period of pixel unit, but for example, when a display is lit, the surface temperature of the display is increased by heat dissipation of a backlight and the size of the support is changed due to the influence. The pixel misalignment is caused by the change in size, and thus a so-called crosstalk that an image for the right eye is recognized by the left eye and an image for the left eye is recognized by the right eye occurs. Accordingly, for the support, it is preferred that the change in size thereof is also suppressed.

Further, a longitudinal direction of a pattern in patterning may be approximately perpendicular to or approximately parallel to the maximum sound velocity direction of the support, but is preferably approximately perpendicular to the direction from the viewpoint of suppressing the change in size.

In addition, from the viewpoint that roll-to-roll may be readily achieved and wrinkles are not easily generated, the directions are preferably approximately parallel to each other.

<Polymer>

The support of the present invention includes a polymer having a moisture absorptivity of 0.5% or more. The moisture absorptivity of a polymer may be controlled by adjusting the chemical structure of a polymer to be described below, and it is possible to control the moisture absorption expansion coefficient of a film by appropriately setting the moisture absorptivity. The relationship between moisture absorptivity and moisture absorption expansion coefficient is changed by the interaction intensity of polymers in a film, such as, for example, degree of crystallinity, molecular weight and degree of entanglement, and thus, it is impossible to uniformly correspond therebetween, but, generally speaking, the moisture absorption coefficient may be increased as the moisture absorptivity is increased by increasing the hydrophilicity of the polymer as described below.

The moisture absorptivity of the polymer is set at 0.5% or more. The moisture absorptivity is preferably 0.7%, and more preferably 1.0% or more. Furthermore, the upper limit thereof is not particularly limited, but from the viewpoint of practicality, the upper limit is preferably 10% or less, and more preferably 7.0% or less.

A film sample with a size of 7 mm×35 mm is measured with a moisture measuring apparatus and a sample drying apparatus "CA-03" and "VA-05" (manufactured by Mitsubishi Chemical Corporation) by the Karl Fischer method as a method for measuring the moisture absorptivity. The measured amount of moisture (g) may be divided by the sample mass (g) to give a moisture content.

Examples of a polymer to be a constituent element of the support relating to the present invention include cellulose ester, polyester, polycarbonate, cycloolefin polymer, vinyl polymer, polyamide, polyimide and the like. In order to achieve an appropriate water vapor permeability, the polymer preferably has a hydrophilic structure such as a hydroxyl group, amide, imide, ester or the like in the main chain or side chain thereof. The polymer is preferably cellulose ester.

As the polymer, powder or particle type may be used, and a pelletized polymer may also be used.

These polymers may be used either alone or in combination of two or more polymers.

Furthermore, for a polymer as a main component of the optical film of the present invention, the above-described polymer is preferably used. Herein, "a polymer as a main component" represents a single polymer when the polymer consists of the single polymer, and represents a polymer with the highest mass fraction among the constituent polymers when the polymer consists of a plurality of polymers.

Further, for the moisture absorptivity, a polymer with a moisture absorptivity of less than 0.5% may be used in combination with a polymer with a moisture absorptivity of 0.5% or more, and even in this case, the moisture absorptivity of the support is preferably 0.5% or more.

A cellulose acylate resin used in the present invention is not particularly limited. Examples of the cellulose as an acylate raw material include cotton linter, wood pulp (broad leaf pulp, and needle leaf pulp) and the like, and a cellulose acylate obtained from any raw material cellulose may be used. In some cases, mixtures thereof may be also used. Detailed descriptions on these raw material celluloses may be found in, for example, "Lecture on Plastic Materials (17) Cellulose Resins" (written by Maruzawa, Uda, The NIKKAN KOGYO SHIMBUN, Ltd., published in 1970) or Japan Institute of Invention and Innovation, Open Technical Report No. 2001-1745 (pages 7 to 8).

First, cellulose acylate preferably used in the present invention is described in detail. The β-1,4 bonding glucose unit constituting cellulose contains free hydroxyl groups at 2-, 3- and 6-positions. Cellulose acylate is a polymer prepared by subjecting a part or the whole of these hydroxyl groups to further esterification with an acyl group having two carbon atoms or more. The degree of acyl substitution means the ratio of esterified hydroxyl groups in cellulose at each of 2-, 3- and 6-positions (100% esterification is defined as a degree of substitution of 1).

The total degree of acyl substitution, that is, DS2+DS3+DS6 is preferably from 1.5 to 3.0, more preferably from 2.0 to 3.0, even more preferably from 2.5 to 3.0, and particularly preferably from 2.7 to 2.98. In addition, from the viewpoint of film-forming property, in some cases, the total degree of acyl substitution is preferably from 2.80 to 2.95, and also particularly preferably from 2.85 to 2.90. Herein, DS2 is a degree of substitution of hydroxyl groups at 2-position of the glucose unit with acyl groups (hereinafter, also referred to as "degree of acyl substitution at 2-position"), DS3 is a degree of substitution of hydroxyl groups at 3-position with acyl groups (hereinafter, also referred to as "degree of acyl substitution at 3-position"), and DS6 is a degree of substitution of hydroxyl groups at 6-position with acyl groups (hereinafter, also referred to as "degree of acyl substitution at 6-position"). Furthermore, DS6/(DS2+DS3+DS6) is a ratio of the degree of acyl substitution at 6-position to the total degree of acyl substitution, and hereinafter will be also referred to as "ratio of acyl substitution at 6-position".

The cellulose ester is an ester of cellulose and an acid. The acid constituting the ester is preferably an organic acid, more preferably carboxylic acid, even more preferably an aliphatic acid having from 2 to 22 carbon atoms, and most preferably a lower aliphatic acid having from 2 to 4 carbon atoms.

The cellulose acylate is an ester of cellulose and carboxylic acid. In the cellulose acylate, all or part of the hydrogen atoms of the hydroxyl groups present at 2-, 3- and 6-positions of the glucose unit constituting the cellulose are substituted with an acyl group. Examples of the acyl group include, for example, acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl and cinnamoyl. The acyl group is preferably acetyl, propionyl, butyryl, dodecanoyl, octadecanoyl, pivaloyl, oleoyl, benzoyl, naphthylcarbonyl and cinnamoyl, and most preferably acetyl, propionyl and butyryl.

The cellulose ester may be only an ester of cellulose and a plurality of acids. Furthermore, the cellulose acylate may be substituted with a plurality of acyl groups.

When the total sum of degrees of substitution of hydroxyl groups at 2-, 3- and 6-positions with acetyl groups refers to DSA and the total sum of degrees of substitution of hydroxyl groups at 2-, 3- and 6-positions with substituent groups other than acetyl groups refers to DSB, the value of DSA+DSB is preferably from 1.5 to 3.0, and the value of DSB is more preferably from 0.1 to 3.0. The values of DSA and DSB within the ranges are preferred because the moisture absorptivity of the polymer may be adjusted. Specifically, the moisture absorptivity may be reduced as DSB is increased.

That is, a cellulose acylate resin used in the film of the present invention is preferably cellulose acetate from the viewpoint of reducibility of nature and environmental load.

Further, in terms of DSB, the substituent group of the hydroxyl group at 6-position is 28% or more, the substituent group of the hydroxyl group at 6-position is more preferably 30% or more, the substituent group of the hydroxyl group at 6-position, is even more preferably 31% or more, and the substituent group of the hydroxyl group at 6-position is particularly preferably 32% or more. A solution having a preferred solubility may be prepared by the film, and in particular, in non-chlorine-based organic solvents, it is possible to prepare a good solution. It is possible to prepare a solution having even lower viscosity and good filterability.

In the acylation of cellulose, when an acid anhydride or an acid chloride is used as an acylating agent, an organic acid, for example, acetic acid, methylene chloride or the like is used as an organic solvent which is a reaction solvent.

With respect to a catalyst, when the acylating agent is an acid anhydride, a protonic catalyst such as sulfuric acid is preferably used, and when the acylating agent is an acid chloride (for example, $CH_3CH_2COCl$), a basic compound is used.

The most common industrial synthesis method of a mixed fatty acid ester of cellulose is a method for acylating cellulose with a mixed organic acid component including a fatty acid (acetic acid, propionic acid, valeric acid and the like) or an acid anhydride thereof corresponding to an acetyl group and other acyl group.

The cellulose ester used in the present invention may be synthesized by a method described in Japanese Patent Application Laid-Open No. H10-45804.

<Additives>

In the support of the present invention, additives may be added to the polymer component, and the balance between coefficient of thermal expansion and humidity expansion coefficient may be changed accordingly. The molecular weight of the additive is not particularly limited, but an additive selected from the group of compounds as described below may be preferably used.

Depending on the addition of the additive, the reduction in humidity expansion coefficient may be larger than the rise in coefficient of thermal expansion, and the effect is clearly shown particularly when the additive is added in an amount of 30% by mass. For this reason, the support is preferably added in an amount of from 30% by mass to 100% by mass.

(Compound Having Positive Intrinsic Birefringence)

It is preferred that the optical film of the present invention includes the compound having a positive intrinsic birefringence.

The compound having a positive intrinsic birefringence also includes a compound known as a plasticizer, an ultraviolet absorbent and the like.

The expression of Re in a stretching direction is improved and preferred by including the compound having a positive intrinsic birefringence. The content of the compound having a positive intrinsic birefringence is preferably from 1% by mass to 35% by mass, more preferably from 4% by mass to 30% by mass, and even more preferably from 10% by mass to 25% by mass, based on the cellulose acylate.

(1) Plasticizer Having Positive Intrinsic Birefringence

In the present invention, as a plasticizer which is the compound having a positive intrinsic birefringence, the following polymeric additive may be widely adopted.

The polymeric additive has a repeating unit in the compound and preferably has a number average molecular weight of from 700 to 10,000. The polymeric additive also has a function of accelerating the volatilization rate of a solvent or a function of reducing the remaining solvent amount, in a solution casting method. In addition, from the viewpoint of film modification such as improvement of mechanical properties, imparting of flexibility, imparting of water absorption resistance, reduction of moisture transmittance and the like, useful effects are shown.

In the present invention, the polymeric additive of the plasticizer having a positive intrinsic birefringence has a number average molecular weight of more preferably from 200 to 10,000, even more preferably from 200 to 5,000, and particularly preferably from 200 to 2,000.

Hereinafter, the polymeric additive used in the present invention will be described in detail with reference to the specific examples thereto, but the polymeric additive of the plasticizer having a positive intrinsic birefringence used in the present invention is not naturally limited thereto.

The polymer-based additive is selected from polyester-based polymers, polyether-based polymers, polyurethane-based polymers, copolymers thereof and the like, and among them, a copolymer of an aliphatic polyester, an aromatic polyester and a polyester containing an aliphatic residue and an aromatic residue is preferred.

(Polyester-Based Polymer)

The polyester-based polymer used in the present invention is obtained by reaction of a dicarboxylic acid component with a diol component. Preferably, the polyester-based polymer is obtained by reaction of a mixture of an aliphatic dicarboxylic acid having from 2 to 20 carbon atoms and an aromatic dicarboxylic acid having from 8 to 20 carbon atoms with at least one diol selected from aliphatic diol having from 2 to 12 carbon atoms, alkyl ether diol having from 4 to 20 carbon atoms and aromatic diol having from 6 to 20 carbon atoms. Both ends of the reactant may be a reactant itself, but a so-called capping of ends may be performed by reacting with monocarboxylic acids, monoalcohols or phenols. It is effective to perform the end-capping from the viewpoint of storability and the like, such that in particular, free carboxylic acids are not contained. The dicarboxylic acid used in the polyester-based polymer of the present invention is preferably an aliphatic dicarboxylic acid residue having from 4 to 20 carbon atoms or an aromatic dicarboxylic acid residue having from 8 to 20 carbon atoms.

Examples of the aliphatic dicarboxylic acid which is preferably used in the present invention include oxalic acid, malonic acid, succinic acid, maleic acid, fumaric acid, glutaric acid, adipic acid, pimelic acid, suberic acid, azelaic acid, sebacic acid, dodecane dicarboxylic acid and 1,4-cyclohexane dicarboxylic acid.

In addition, examples of the aromatic dicarboxylic acid having from 8 to 20 carbon atoms include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid, 2,6-naphthalene dicarboxylic acid and the like.

Among them, examples of a preferred aliphatic dicarboxylic acid include malonic acid, succinic acid, maleic acid, fumaric acid, glutaric acid, adipic acid, azelaic acid and 1,4-cyclohexane dicarboxylic acid, and examples of the aromatic dicarboxylic acid include phthalic acid, terephthalic acid, isophthalic acid, 1,5-naphthalene dicarboxylic acid and 1,4-naphthalene dicarboxylic acid. Particularly preferably, examples of the aliphatic dicarboxylic acid component include succinic acid, glutaric acid and adipic acid, and examples of the aromatic dicarboxylic acid include phthalic acid, terephthalic acid and isophthalic acid.

In the present invention, more particularly preferably, a dicarboxylic acid component of the polyester-based polymer is an aspect in which terephthalic acid and naphthalene dicarboxylic acid are used, and more preferably an aspect in which terephthalic acid is used.

A diol used in the polyester-based polymer which is a high molecular weight additive is selected from, for example, an aliphatic diol having 2 to 20 carbon atoms, an alkyl ether diol having from 4 to 20 carbon atoms and an aromatic ring-containing diol having 6 to 20 carbon atoms.

Examples of an aliphatic diol having from 2 to 20 carbon atoms include alkyl diol and alicyclic dolos, and for example, ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol heptane), 2-n-butyl-2-ethyl-1,3propanediol (3,3-dimethylol heptane), 3-methyl-1,5-pentanediol, 1,6-hexanediol, 2,2,4- trimethyl-1,3-pentanediol, 2-ethyl-1,3-hexanediol, 2-methyl-1,8-octanediol, 1,9-nonanediol, 1,10-decanediol, 1,12-octadecanediol and the like. The aliphatic diol is used either alone or in combination of two or more.

Examples of a preferred aliphatic diol include ethanediol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexanediol and 1,4-cyclcohexane dimethanol, and examples of a particularly preferred aliphatic diol include ethanediol, 1,2-propanediol, 1,3-propanediol, 1,2-butanediol, 1,3-butanediol, 1,4-butanediol, 1,5-pentanediol, 1,6-hexanediol, 1,4-cyclohexanediol and 1,4-cyclohexane dimethanol.

In the present invention, more particularly preferably, a diol component of the polyester-based polymer is an aspect in which ethane diol and propane diol are used, and more preferably an aspect in which ethane diol is used.

Examples of the alkyl ether diol having from 4 to 20 carbon atoms preferably include polytetra methylene ether glycol, polyethylene ether glycol, polypropylene ether glycol and combinations thereof. The average polymerization degree thereof is not particularly limited, but is preferably from 2 to 20, more preferably 2 to 10, even more preferably from 2 to 5, and particularly preferably from 2 to 4. Examples of commercially available polyether glycols which are typically useful include Carbowax resins, Pluronics resins, and Niax resins.

Examples of the aromatic diol having from 6 to 20 carbon atoms are not particularly limited, but include bisphenol A, 1,2-hydroxy benzene, 1,3-hydroxy benzene, 1,4-hydroxy benzene, 1,4-benzene dimethanol, and preferably bisphenol A, 1,4-hydroxy benzene and 1,4-benzene dimethonal.

In the present invention, particularly, the compound of which ends are capped by an alkyl group or an aromatic group is preferred. Protecting the ends with any hydrophobic functional group is effective for preventing degradation with lapse of time at high temperature and high humidity, and is a factor of serving as delaying the hydrolysis of ester groups.

In order to prevent both ends of the polyester-based polymer from becoming carboxylic acid or OH, it is preferred to protect with a monoalcohol residue or a monocarboxylic acid residue.

In this case, as a monoalcohol, substituted or unsubstituted monoalcohols having from 1 to 30 carbon atoms are preferred, and examples thereof include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodeca hexanol, dodeca octanol, allyl alcohol, oleyl alcohol and the like, and substituted alcohols such as benzyl alcohol, 3-phenyl propanol and the like.

Examples of the alcohol which may be preferably used for capping the ends include methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol and benzyl alcohol, and particular examples thereof include methanol, ethanol, propanol, isobutanol, cyclohexyl alcohol, 2-ethylhexyl alcohol, isononyl alcohol and benzyl alcohol.

Further, when a monocarboyxlic acid residue is used for capping, monocarboxylic acids used as the monocarboxylic acid residue are preferably substituted or unsubstituted monocarboxylic acids having from 1 to 30 carbon atoms. The monocarboxylic acids may be aliphatic monocarboxylic acids or aromatic ring-containing carboxylic acids. Preferred examples of the aliphatic monocarboxylic acids include acetic acid, propionic acid, butanoic acid, caprylic acid, caproic acid, decanoic acid, dodecanoic acid, stearic acid and oleic acid, examples of the aromatic monocarboxylic acids include benzoic acid, p-tert-butyl benzoic acid, p-tert-amyl benzoic acid, orthotoluic acid, methatoluic acid, paratoluic acid, dimethyl benzoic acid, ethyl benzoic acid, n-propyl benzoic acid, amino benzoic acid and acetoxy benzoic acid. These compounds may be used either alone or in combination of two or more.

In the present invention, the aspect in which both ends of the polyester-based polymer are capped with acetic acid and propionic acid is more particularly preferred, and the aspect in which is both ends of the polyester-based polymer are capped with acetic acid is even more preferred.

These polymeric additives of the present invention may be easily synthesized by any of a thermal-fusing condensation method by polyesterification or transesterification of a dicarboxylic acid and diol and/or a monocarboxylic acid or monoalcohol for capping ends thereof by any typical method, or an interface condensation method of acid chlorides of these acids and glycols. These polyester-based additives are described in detail in "Additive-Theory and Application" (First Edition, First Impression, published by Saiwai Shobo, Mar. 1, 1973) edited by Koichi Murai. In addition, usable are materials described in Japanese Patent Application Laid-Open Nos. H05-155809, H05-155810, H5-197073, 2006-259494, H07-330670, 2006-342227, 2007-003679 and the like.

Furthermore, as commercially available products, Adekacizer (there are various products such as Adekacizer P series and Adekacizer PN series) described in DIARY 2007, pp. 55-27 may be used as a polyester-based plasticizer from ADEKA Co., Ltd., and various products of Polylite described in Polymer-related Commodity List (2007), p. 25 by Dainippon Ink & Chemicals, Inc., or various Polycizers described in "DICno Polymer kaishituzai" (published Apr. 1, 2004. 000 VIII) pp. 2-5 (2004) by Dainippon Ink & Chemicals, Inc. may be used. Further, a series of Plasthall P from CP Hall Co., USA may be purchased. A benzoyl functional polyether is commercially available from Velsicol Chemicals in Rosemont, Ill. under the trade name of BENZOFLEX (for example, BENZOFLEX400, polypropylene glycol dibenzoate).

Hereinafter, specific examples of the polyester-based polymer which may be used in the present invention will be described, but the polyester-based polymers which may be used in the present invention are not limited thereto.

Compound AA: Acetic acid esterified form (number average molecular weight 1,000) at both ends of a condensate of ethanediol/terephthalic acid (1/1 molar ratio).

PP-1: Condensate (number average molecular weight of 2,500) of ethanediol/succinic acid (1/1 molar ratio)

PP-2: Condensate (number average molecular weight of 1,500) of 1,3-propanediol/glutaric acid (1/1 molar ratio)

PP-3: Condensate (number average molecular weight of 1,300) of 1,3-propanediol/adipic acid (1/1 molar ratio)

PP-4: Condensate (number average molecular weight of 1,500) of 1,3-propanediol/ethylene glycol/adipic acid (1/1/2 molar ratio)

PP-5: Condensate (number average molecular weight of 1,200) of 2-methyl-1.3-propanediol/adipic acid (1/1 molar ratio)

PP-6: Condensate (number average molecular weight of 1,500) of 1,4-butanediol/adipic acid (1/1 molar ratio)

PP-7: Condensate (number average molecular weight of 800) of 1,4-cyclohexanediol/succinic acid (1/1 molar ratio)

PP-8: Butyl esterified form (number average molecular weight of 1,300) at both ends of a condensate of 1,3-propanediol/succinic acid (1/1 molar ratio)

PP-9: Cyclohexyl esterified form (number average molecular weight of 1,500) at both ends of a condensate of 1,3-propanediol/glutaric acid (1/1 molar ratio)

PP-10: 2-ethylhexyl esterified form (number average molecular weight of 3,000) at both ends of a condensate of ethanediol/succinic acid (1/1 molar ratio)

PP-11: Isononyl esterified form (number average molecular weight of 1,500) at both ends of a condensate of 1,3-propanediol/ethylene glycol/adipic acid (1/1/2 molar ratio)

PP-12: Propyl esterified form (number average molecular weight of 1,300) at both ends of a condensate of 2-methyl-1,3-propanediol/adipic acid (1/1 molar ratio)

PP-13: 2-ethylhexyl esterified form (number average molecular weight of 1,300) at both ends of a condensate of 2-methyl-1,3-propanediol/adipic acid (1/1 molar ratio)

PP-14: Isononyl esterified form (number average molecular weight of 1,300) at both ends of a condensate of 2-methyl-1,3-propanediol/adipic acid (1/1 molar ratio)

PP-15: Butyl esterified form (number average molecular weight of 1,800) at both ends of a condensate of 1,4-butanediol/adipic acid (1/1 molar ratio)

PP-16: Condensate (number average molecular weight of 2,000) of ethanediol/terephthalic acid (1/1 molar ratio)

PP-17: Condensate (number average molecular weight of 1,500) of 1,3-propanediol/1,5-naphthalene dicarboxylic acid (1/1 molar ratio)

PP-18: Condensate (number average molecular weight of 1,200) of 2-methyl-1,3-propanediol/isophthalic acid (1/1 molar ratio)

PP-19: Benzyl esterified form (number average molecular weight of 1,500) at both ends of a condensate of 1,3-propanediol/terephthalic acid (1/1 molar ratio)

PP-20: Condensate (number average molecular weight of 1,500) of propyl esterified bodies (1/1 molar ratio) at both ends of 1,3-propanediol/1,5-naphthalene dicarboxylic acid PP-21: Butyl esterified form (number average molecular weight of 1,200) at both ends of a condensate of 2-methyl-1,3-propanediol/isophthalic acid (1/1 molar ratio)

PP-22: Condensate (number average molecular weight of 1,800) of poly(average polymerization degree 5) propylene ether glycol/succinic acid (1/1 molar ratio)

PP-23: Condensate (number average molecular weight of 1,600) of poly(average polymerization degree 3) ethylene ether glycol/glutaric acid (1/1 molar ratio)

PP-24: Condensate (number average molecular weight of 2,200) of poly(average polymerization degree 4) propylene ether glycol/adipic acid (1/1 molar ratio)

PP-25: Condensate (number average molecular weight of 1,500) of poly(average polymerization degree of 4) propylene ether glycol/phthalic acid (1/1 molar ratio)

PP-26: Butyl esterified form (number average molecular weight of 1,900) at both ends of a condensate of poly(average polymerization degree of 5) propylene ether glycol/succinic acid (1/1 molar ratio)

PP-27: 2-ethylhexyl esterified form (number average molecular weight of 1,700) at both ends of a condensate of poly(average polymerization degree of 3) ethylene ether glycol/glutaric acid (1/1 molar ratio)

PP-28: tert-nonyl esterified form (number average molecular weight of 1,300) at both ends of a condensate of poly (average polymerization degree of 4) propylene ether glycol/adipic acid (1/1 molar ratio)

PP-29: Propyl esterified form (number average molecular weight of 1,600) at both ends of a condensate of poly(average polymerization degree of 4) propylene ether glycol/phthalic acid (1/1 molar ratio)

PP-30: Polyester urethane compound obtained by condensing a condensate (number average molecular weight of 1,500) of 1,3-propanediol/succinic acid (1/1 molar ratio) with trimethylene diisocyanate (1 mole)

PP-31: Polyester-urethane compound obtained by condensing a condensate (number average molecular weight of 1,200) of 1,3-propanediol/glutaric acid (1/1 molar ratio) with tetramethylene diisocyanate (1 mole)

PP-32: Polyester-urethane compound obtained by condensing a condensate (number average molecular weight of 1,000) of 1,3-propanediol/adipic acid (1/1 molar ratio) with p-phenylene diisocyanate (1 mole)

PP-33: Polyester-urethane compound obtained by condensing a condensate (number average molecular weight of 1,500) of 1,3-propanediol/ethylene glycol/adipic acid (1/1/2 molar ratio) with tolylene diisocyanate (1 mole)

PP-34: Polyester-urethane compound obtained by condesating a condensate (number average molecular weight of 1,200) of 2-methyl-1,3-propanediol/adipic acid (1/1 molar ratio) with m-xylene diisocyanate (1 mole)

PP-35: Polyurethane compound obtained by condensing a condensate (number average molecular weight of 1,500) of 1,4-butanediol/adipic acid (1/1 molar ratio) with tetramethylene diisocyanate (1 mole)

PP-40: Condensate (number average molecular weight of 1,000) of ethanediol/adipic acid (1/1 molar ratio)

PP-51: Polyisopropyl acrylate (number average molecular weight of 1,300)

PP-52: Polybutyl acrylate (number average molecular weight of 1,300)

PP-53: Polyisopropyl methacrylate (number average molecular weight of 1,200)

PP-54: Poly(methyl methacrylate/butyl methacrylate (molar ratio 8/2, number average molecular weight of 1,600)

PP-55: Poly(methyl methacrylate/2-ethylhexyl methacrylate (molar ratio 9/1, number average molecular weight of 1,600)

PP-60: Poly(vinyl acetate (number average molecular weight of 2,400)

In the present invention, among the polymer compounds, compounds known as an optically anisotropic controlling agent are preferably used. The optically anisotropic controlling agents are described in Japanese Patent Application Laid-Open No. 2005-104148.

Further, the polymeric additive is preferably used in combination with in particular, a cellulose acylate having a high total degree of acyl substitution from the viewpoint of axis inversion.

In the present invention, as a plasticizer having a positive intrinsic birefringence, the compound AA, which is also an optically anisotropic controlling agent, is particularly preferably used. Even from the viewpoint of combination with a cellulose acylate having a high total degree of acyl substitution, the compound AA is preferred.

(2) Ultraviolet absorbent having positive intrinsic birefringence

It is preferred to include the ultraviolet absorbent having a positive intrinsic birefringence from the viewpoint of axis inversion.

Examples of the ultraviolet absorbent having a positive intrinsic birefringence include an ultraviolet absorbent described in Japanese Patent Application Laid-Open No. 2009-262551.

Hereinafter, specific examples of the ultraviolet absorbent having a positive intrinsic birefringence will be illustrated, but the present invention is not limited to the following compounds.

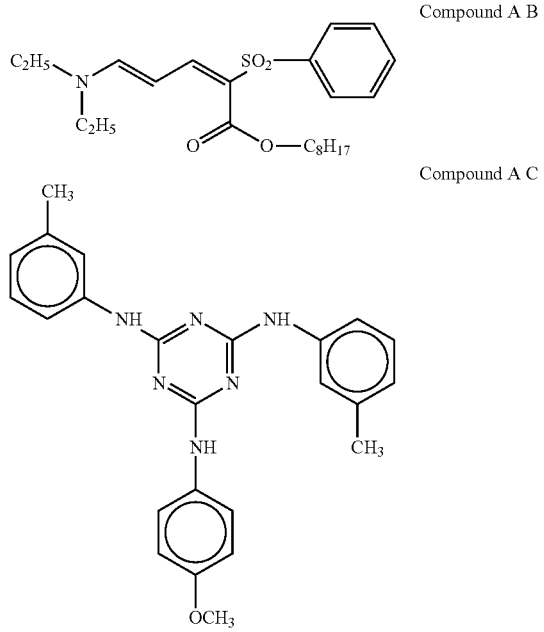

(Compound Having Infrared Absorption Capacity)

From the viewpoint that the efficiency is increased when infrared laser is used as a thermal irradiation in the heating process of some regions by a method for preparing the optical film of the present invention as described below, it is preferred that the optical film of the present invention includes the compound having infrared absorption capacity.

As the compound having infrared absorption capacity, compounds well known as an additive of a cellulose acylate film may be widely adopted, and are described in, for example, Japanese Patent Application Laid-Open No. 2001-194522 and the like. In addition, preferred examples thereof also include diimmonium salts.

Among them, diimmonium salts (for example, KAYA-SORB IRG-022 (manufactured by Nippon Kayaku Co., Ltd., λmax=1100 nm)) and aminium salts are preferred, and diimmonium salts are more preferred.

[Preparation Method of Support]

The support of the present invention will be described. Hereinafter, examples of cellulose acylates will be described, but films may be formed likewise even in the case of other polymer materials.

For a film (support) including cellulose acylate, the film may be formed by using a solution casting film forming method or a melt film forming method.

(Polymer Solution)

In the solution casting film forming method, a web is formed by using the cellulose acylate or a polymer solution (a cellulose acylate solution) containing various additives if necessary. Hereinafter, a polymer solution (hereinafter, appropriately referred to as a cellulose acylate solution in some cases) in the present invention, which may be used in the solution casting film forming method, will be described.

As a main solvent of the polymer solution in the present invention, an organic solvent which is a good solvent of cellulose acylate may be preferably used. As the organic solvent an organic solvent with a boiling temperature of 80° C. or lower is more preferred from the viewpoint of reduction in dry load. The boiling temperature of the organic solvent is more preferably from 10° C. to 80° C., and particularly preferably from 20° C. to 60° C. In addition, in some cases, an organic solvent having a boiling temperature of from 30° C. to 45° C. may also be appropriately used as the main solvent. In the present invention, among the group of solvents as described below, particularly halogenated hydrocarbons may be preferably used as a main solvent. Among the halogenated hydrocarbons, chlorinated hydrocarbon is preferred, dichloromethane and chloroform are more preferred, and dichloromethane is most preferred. Furthermore, a solvent having a small ratio of volatilizing at the same time as a halogenated hydrocarbon in the initial stage of the drying process and having a boiling temperature of the gradually concentrated solvent of 95° C. or higher, may be contained in an amount of from 1% by mass to 15% by mass, preferably in an amount of from 1% by mass to 10% by mass, and more preferably in an amount of from 1.5% by mass to 8% by mass, based on the entire solvent. Moreover, a solvent having a boiling temperature of 95° C. or higher is preferably a poor solvent of cellulose acylate. Specific examples of the solvents having a boiling temperature of 95° C. or higher include solvents having a boiling temperature of 95° C. or higher among the specific examples of "organic solvent used in combination of the main solvent". However, among them, butanol, pentanol and 1,4-dioxane are preferably used. Further, the solvent in the polymer solution of the present invention contains alcohol in an amount of 5% by mass to 40% by mass, preferably 10% by mass to 30% by mass, more preferably from 12% by mass to 25% by mass, and even more preferably from 15% by mass to 25% by mass. Specific examples of the alcohol herein used include solvents exemplified as an alcohol of "organic solvent used in combination with the main solvent" as described below. However, among them, methanol, ethanol, propanol and butanol are preferably used. In addition, when the above-described "solvent having a boiling temperature of 95° C. or higher" is an alcohol such as butanol and the like, the content thereof is also calculated as the alcohol content which is referred to herein. The mechanical strength of the cellulose acylate film manufactured at the heat treatment temperature may be increased by using the solvent, and thus, the film obtained by being stretched more than necessary during the heat treatment may be prevented from being easily broken.

Examples of the main solvent include particularly preferably a halogenated hydrocarbon, and include ester, ketone, ether, alcohol, a hydrocarbon and the like in some cases. The compounds may include a branched structure or a cyclic structure. Furthermore, the main solvent may have any two or more functional groups of ester, ketone, ether and alcohol (that is, —O—, —CO—, —COO— and —OH). Further, hydrogen atoms in the hydrocarbon moiety of the ester, ketone, ether and alcohol may be substituted with a halogen atom (particularly, fluorine atom). In addition, the main solvent of the polymer solution in the present invention, which is used in the manufacture of a cellulose acylate film used in the preparation method of the present invention, represents a single solvent when the solvent consists of the single polymer, and represents a solvent having the highest mass fraction among the constituent solvents when the solvent consists of a plurality of solvents. Examples of the main solvent appropriately include a halogenated hydrocarbon.

As the halogenated hydrocarbon, a chlorinated hydrocarbon is more preferred, and examples thereof include dichloromethane, chloroform and the like. Dichloromethane is even more preferred.

Examples of the ester include methyl formate, ethyl formate, methyl acetate, ethyl acetate and the like.

Examples of the ketone include acetone, methyl ethyl ketone and the like.

Examples of the ether include diethyl ether, methyl-tert-butyl ether, diisopropyl ether, dimethoxymethane, 1,3-dioxolan, 4-methyldioxolan, tetrahydrofuran, methyltetrahydrofuran, 1,4-dioxane and the like.

Examples of the alcohol include methanol, ethanol, 2-propanol and the like.

Examples of the hydrocarbon include n-pentane, cyclohexane, n-hexane, benzene, toluene, xylene and the like.

Examples of an organic solvent used in combination with these main solvents include a halogenated hydrocarbon, ester, ketone, ether, alcohol, a hydrocarbon and the like. These compounds may have a branched structure or a cyclic structure. In addition, the organic solvent may have any two or more functional groups of ester, ketone, ether and alcohol (that is, —O—, —CO—, —COO— and —OH). Furthermore, hydrogen atoms in the hydrocarbon moiety of the ester, ketone, ether and alcohol may be substituted with a halogen atom (particularly, fluorine atom).

As the halogenated hydrocarbon, a chlorinated hydrocarbon is more preferred, and examples thereof include dichloromethane, chloroform and the like. Dichloromethane is even more preferred.

Examples of the ester include methyl formate, ethyl formate, propyl formate, pentyl formate, methyl acetate, ethyl acetate, pentyl acetate and the like.

Examples of the ketone include acetone, methyl ethyl ketone, diethyl ketone, diisobutyl ketone, cyclopentanol, cyclohexanone, methylcyclohexanone and the like.

Examples of the ether include diethyl ether, methyl-tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, phenetole and the like.

Examples of the alcohol include methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol and the like. An alcohol having from 1 to 4 carbon atoms is preferred, methanol, ethanol or butanol is more preferred, and methanol and butanol are most preferred. Examples of the hydrocarbon include n-pentane, cyclohexane, n-hexane, benzene, toluene, xylene and the like.

Examples of the organic solvent having any two or more functional groups include 2-ethoxyethyl acetate, 2-methoxy ethanol, 2-butoxy ethanol, methyl acetoacetate and the like.

In the present invention, the polymer constituting a cellulose acylate film includes a hydrogen bonding functional group such as a hydroxyl group, ester, ketone and the like, and thus it is preferred that the entire solvent contains 5% by mass to 30% by mass, more preferably from 7% by mass to 25% by mass and even more preferably from 10% by mass to 20% by mass of alcohol from the viewpoint of reducing the load of peeling-off from a casting support.

The expression of Re or Rth of a cellulose acylate film prepared by the preparation method of the present invention may be easily adjusted by adjusting the content of alcohol. Specifically, as the content of alcohol is increased, it is possible to set the heat treatment temperature at a relatively low level or enhance the extent of Re or Rth.

Further, in the present invention, containing a small amount of water is also effective to increase the solution viscosity or the film strength in the state of a wet film during drying, or to increase the dope strength during a drum method casting. For example, water is contained in an amount of preferably from 0.1% by mass to 5% by mass, more preferably from 0.1% by mass to 3% by mass, and particularly preferably from 0.2% by mass to 2% by mass, based on the entire solution.

Examples of combinations of organic solvents which are preferably used as a solvent of the polymer solution in the present invention are mentioned in Japanese Patent Application Laid-Open No. 2009-262551.

In addition, a non-halogen-based organic solvent may be used as the main solvent if necessary, and a detailed description thereof is described in Japan Institute of Invention and Innovation, Open Technical Report (Open Technical No. 2001-1745, published in Mar. 15, 2001, and Japan Institute of Invention and Innovation).

The concentration of cellulose acylate in the polymer solution in the present invention is preferably from 5% by mass to 40% by mass, more preferably from 10% by mass to 30% by mass, and most preferably from 15% by mass to 30% by mass.

The concentration of cellulose acylate may be adjusted so as to be a predetermined concentration in the step of dissolving the cellulose acylate in the solvent. Furthermore, a solution at a low concentration (for example, from 4% by mass to 14% by mass) is prepared in advance, and then the solution may be concentrated by evaporating the solvent and the like. Furthermore, a solution at a high concentration is prepared in advance, and then the solution may be diluted. Further, the concentration of cellulose acylate may be reduced by adding an additive thereto.

The time at which an additive is added thereto may be appropriately determined according to the kind of the additive.

It is preferred that no additives used in the cellulose acylate film of the present invention are substantially volatilized during the drying process. As the amount of the additive added is increased, problems such as reduction in glass transition temperature of the polymer film or volatilization of the additive in the preparation process of the film are easily caused, and thus, the amount of the additive having a molecular weight of 3,000 or less is preferably from 0.01% by mass to 30% by mass, more preferably from 2% by mass to 30% by mass, and even more preferably from 5% by mass to 20% by mass, based on the polymer.

(Preparation of Polymer Solution)

The preparation of the polymer solution in the present invention may be performed in accordance with, for example, Japanese Patent Application Laid-Open Nos. S58-127737 and S61-106628, Japanese Patent Application Laid-Open Nos. H276830, H4-259511, H5-163301, H9-95544, H10-45950, H10-95854, H11-71463, H11-302388, H11-322946, H11-322947 and H11-323017, and Japanese Patent Application Laid-Open Nos. 2000-53784, 2000-273184 and 2000-273239. Specifically, the polymer solution in the present invention is obtained by mixing a polymer and a solvent and stiffing the mixture to swell the mixture, cooling or heating the mixture in some cases to dissolve the mixture, and then filtering the mixture.

In order to improve the solubility of the polymer in the solvent in the present invention, it is preferred that a process of cooling and/or heating the mixture of the polymer and the solvent is included.

When a halogen-based organic solvent is used as the solvent to cool the mixture of cellulose acylate and the solvent, it is preferred to include a process of cooling the mixture to from −100° C. to 10° C. Furthermore, it is preferred to include a process of swelling the mixture at from −10° C. to 39° C. in a process before the cooling process and include a process of warming the mixture to from 0° C. to 39° C. in a process after the cooling.

When a halogen-based organic solvent is used as the solvent to heat the mixture of cellulose acylate and the solvent, it is preferred to include a process of dissolving cellulose acylate in the solvent by one or more methods selected from the following (a) or (b).

(a) Swelling is performed at from −10° C. to 39° C., the obtained mixture is warmed to from 0° C. to 39° C.

(b) Swelling is performed at from −10° C. to 39° C., the obtained mixture is heated to from 40° C. to 240° C. at from 0.2 MPa to 30 MPa, and the heated mixture is cooled to from 0° C. to 39° C.

Further, when a non-halogen-based organic solvent is used as the solvent to cool the mixture of cellulose acylate and the solvent, it is preferred to include a process of cooling the mixture to from −100° C. to 10° C. is included. In addition, it is preferred to include a process of swelling the mixture at from −10° C. to 55° C. in a process before the cooling process and include a process of warming the mixture to from 0° C. to 57° C. in a process after the cooling.

When a halogen-based organic solvent is used as the solvent to heat the mixture of cellulose acylate and the solvent, it is preferred to include a process of dissolving cellulose acylate in the solvent by one or more methods selected from the following (c) or (d) is included.

(c) Swelling is performed at from −10° C. to 55° C., the obtained mixture is warmed to from 0° C. to 57° C.

(b) Swelling is performed at from −10° C. to 55° C., the obtained mixture is heated to from 40° C. to 240° C. at from 0.2 MPa to 30 MPa, and the heated mixture is cooled to from 0° C. to 57° C.

(Film Formation of Web)

The web in the present invention may be formed by a solution casting film forming method using the polymer solution in the present invention. In carrying out the solution casting film forming method, an apparatus known in the art may be used according to a method in the related art. Specifically, a dope (polymer solution in the present invention) prepared in a dissolver (tank) is filtered and once stored in a storage tank, and bubbles included in the dope is defoamed to prepare the dope finally. The dope is kept warm at 30° C., and sent from a dope outlet to a pressurized die, for example, through a pressurized metering gear pump which may perform quantitative solution sending with a high degree of accuracy by revolutions. The dope is uniformly cast from an inlet member (slit) of the pressurized die onto a metal support of a casting unit running endlessly (a dope casting process). Subsequently, a half-dry dope film (web) is peeled off from the metal support at a peeling-off point where the metal support has approximately gone round, and subsequently conveyed to a drying zone to terminate drying while conveying with a group of rolls. Details of the casting process and the drying process of the solution casting film forming method are described also in Japanese Patent Application Laid-Open No. 2005-104148, pages 120 to 146, and may also be appropriately applied to the invention.

In the present invention, as the metal support used in the film formation of the web, a metal band or a metal drum may be used.

(Stretching Process)

It is preferred that the method for preparing a cellulose acylate film includes a process of stretching the entire film including cellulose acylate in a specific direction. For the support relating to the present invention, the coefficient of thermal expansion and humidity expansion coefficient in the stretching direction may be reduced by performing stretching. The stretching may be a stretching in a conveying direction, a stretching in a direction which is not identical to the conveying direction (for example, a direction perpendicular to the conveying direction), and a biaxial stretching produced by a combination thereof.

The stretching magnification in the stretching direction is preferably 10% or more, more preferably from 10% to 100%, and even more preferably from 20% to 90%.

For a method for controlling the anisotropic property of the elastic modulus by performing stretching without increasing the haze of a film, a stretching method, including: performing stretching under a specific condition, which is described in Japanese Patent Application Laid-Open No. 2007-176164 and the like, or a stretching method, including: first increasing the haze and then reducing the haze, which is described in Japanese Patent Application Laid-Open No. 2009-137289 and the like, may be preferably used. In addition, for a method for controlling the anisotropic property of the elastic modulus by performing stretching while the solvent remains in the film, a stretching method described in Japanese Patent Application Laid-Open No. 2007-119717 and the like may be preferably used.

Furthermore, "stretching magnification (%)" used in the present specification means obtaining the stretching magnification by the following equation.

$$\text{Stretching magnification}(\%) = 100 \times \{(\text{length after stretching}) - (\text{length before stretching})\}/\text{length before stretching}$$

Further, the stretching speed of the web in the stretching process is not particularly limited, but is preferably from 1%/min to 1,000%/min, and more preferably from 1%/min to 100%/min from the viewpoint of stretching suitability (wrinkles, handling and the like). The stretching may be performed in a single step or may be performed in multiple steps. Furthermore, the stretching may be imposed in a direction (transverse direction) going straight to a conveying direction.

The web subjected to the stretching process is subsequently conveyed into a drying zone, and then the drying process may be performed after the stretching process. In the drying process, the web is dried by the tenter having clips while being fixed at both edges thereof or while conveying with a group of rolls.

[Coefficient of Thermal Expansion]

The coefficient of thermal expansion a in a direction parallel to the maximum sound velocity direction of the support in the present invention is preferably from $5.0 \times 10^{-6}/°$ C. to $500 \times 10^{-6}/°$ C., and more preferably from $10.0 \times 10^{-6}/°$ C. to $200 \times 10^{-6}/°$ C. The coefficient of thermal expansion α may be measured in accordance with ISO11359-2, and may be calculated from a slope of the length in the maximum sound velocity direction of the support when the sample is heated from room temperature to 80° C., and then the temperature is decreased from 60° C. to 50° C.

[Humidity Expansion Coefficient]

In the present invention, when the humidity expansion coefficient β is measured, a support sample with a length of 25 cm (measuring direction) and width of 5 cm, in which the maximum sound velocity direction is extracted as a longitudinal direction, is prepared. Pin holes are drilled at an interval of 20 cm on the sample, humidity is controlled at 25° C. and 10% relative humidity (RH) for 24 hr, and then the interval of the pin holes is measured by a pin gauge (making the measured value $L_0$). Subsequently, the sample is humidity conditioned at 25° C. and 80% RH for 24 hr, and the interval of the pin holes is measured (making the measured value $L_1$). The humidity expansion coefficient is calculated by the following equation using the measured value.

Humidity expansion coefficient[/% RH]=$\{(L_1-L_0)/L_0\}/(R_1-R_0)$

The humidity expansion coefficient β of the support of the present invention may be appropriately set according to the combination with the coefficient of thermal expansion α, but is preferably $3.0 \times 10^{-6}$/% RH to $500 \times 10^{-6}$/% RH, more preferably from $4.0 \times 10^{-6}$/% RH to $100 \times 10^{-6}$/% RH, even more preferably from $5.0 \times 10^{-6}$/% RH to $50 \times 10^{-6}$/% RH, and most preferably from $5.0 \times 10^{-6}$/% RH to $40 \times 10^{-6}$/% RH.

In reducing the size change of the support according to the combination of the coefficient of thermal expansion α and the humidity expansion coefficient β, the coefficient of thermal expansion α and the humidity expansion coefficient β are preferably from $5.0 \times 10^{-6}$/° C. to $500 \times 10^{-6}$/° C. and from $3.0 \times 10^{-6}$/% RH to $500 \times 10^{-6}$/% RH, more preferably from $5.0 \times 10^{-6}$/° C. to $500 \times 10^{-6}$/° C. and from $4.0 \times 10^{-6}$/% RH to $100 \times 10^{-6}$/% RH, and even more preferably from $10.0 \times 10^{-6}$/° C. to $100 \times 10^{-6}$/° C. and from $5.0 \times 10^{-6}$/% RH to $40 \times 10^{-6}$/% RH.

[Sound Velocity]

The direction in which the sound velocity (acoustic wave propagation velocity) becomes the maximum in the present invention is obtained as a direction in which a propagation velocity of a longitudinal wave vibration of ultrasonic pulse becomes the maximum by humidity-controlling the support at 25° C. and 60% RH for 24 hr and then using an alignment-property meter (SST-2500: manufactured by Nomura Shoji Co., Ltd.). In the support of the present invention, an angle between the direction of an in-plane slow axis and the direction in which the sound velocity becomes the maximum is preferably from 75° to 105°, more preferably from 85° to 95°, even more preferably from 87° to 93°, and most preferably from 89° to 91°.

[Elastic Modulus]

The elastic modulus of the support in the present invention is a tensile elastic modulus obtained from an initial slope of a stress-strain curve by preparing a support sample with a length of 150 mm and a width of 10 mm, humidity-controlling the sample at 25° C. and 60% RH for 24 hr and performing the measurement at an initial sample length of 100 mm and a tensile speed of 10 mm/min in accordance with the standard of ISO527-3:1995. The elastic modulus of the support in the present invention is not particularly limited, but the elastic modulus (E1) is preferably from 1 GPa to 50 GPa, more preferably from 5 GPa to 50 GPa, and even more preferably from 7 GPa to 20 GPa, in the direction in which the sound velocity becomes the maximum. The elastic modulus may be controlled by the type of polymer, the type and amount of additive, and stretching.

[Retardation of Support]

As the support of the optical film of the present invention, a support satisfying the following equation (I) is preferred because the optical influence in the pattern retardation layer may be maintained at a low level.

$||Re(550)|<5$ and $|Rth(550)|<20$      Equation (I)

Re (λ) and Rth (λ) represent retardation values (unit; nm) in an in-plane direction and a film-thickness direction, respectively at a wavelength of λ (unit; nm).

(Pattern Retardation Layer)

(Shape of First Region and Second Region)

The optical film of the present invention has a first retardation region (hereinafter, simply referred to as a first region) and a second retardation region (hereinafter, simply referred to as a second region), in which birefringence is mutually different from each other, and an optically anisotropic layer (hereinafter, also referred to as a pattern retardation) in which the first retardation region and the second retardation region are alternately patterned for every one line. It is preferred that the first region and the second region have a belt-like shape with the lengths of the short sides of the regions almost identical to each other, and are repetitively and alternately patterned from the viewpoint of being used for a 3D stereoscopic image display system.

For the optical film of the present invention, it is preferred that the slow axis of the first region and the slow axis of the second region are approximately perpendicular to each other from the viewpoint that the polarization state of light passed through the first region and the second region may be switched from the linearly polarized light to the circularly polarized light or from the circularly polarized light to the linearly polarized light.

Further, for the optical film of the present invention, it is more preferred that the slow axis of the first region and the slow axis of the second region are perpendicular to each other from the viewpoint that the polarization state of light passed through the first region and the second region may be switched from the linearly polarized light to the circularly polarized light or from the circularly polarized light to the linearly polarized light, without being elliptically polarized.

For the optical film of the present invention, it is preferred that the direction of the long side of the pattern and the direction in which the sound velocity of the support becomes the maximum are approximately perpendicular to each other from the viewpoint that the misalignment of the pattern region and the pixel may be reduced and the crosstalk may be suppressed.

(Retardation)

As described above, it is preferred that a pattern retardation layer having a function of converting the linearly polarized light into the circularly polarized light, or the circularly polarized light into the linearly polarized light has a ¼ retardation of the wavelength. In general, the retardation is called as a ¼ wavelength plate, and at a visible light wavelength of 550 nm, Re=137.5 nm becomes an ideal value.

In addition, a pattern retardation layer of converting the linearly polarized light into the circularly polarized light or the circularly polarized light into the linearly polarized light does not always have a ¼ retardation. For example, the retardation may be a −¼ or ¾ retardation of the wavelength, and if the relationship is expressed by a general formula, the retardation may have a ¼±n/2 (n is an integer) retardation of the wavelength.

For the patterning in which the slow axis of the first region and the slow axis of the second region are perpendicular to each other, it is preferred that regions having a −¼ or ¼ retardation of the wavelength may be alternately formed. At this time, the slow axes of the respective regions are almost perpendicular to each other. Furthermore, ¼ and ¾ retardations of the wavelength may be patterned, and at this time, the slow axes of the respective regions are almost parallel to each other. However, the rotation directions of the circularly polarized light of the respective regions are opposite to each other.

Furthermore, for the patterning of the ¼ and ¾ retardation of the wavelength, ½ or −½ retardation of the wavelength may be formed after the ¼ of the wavelength is formed on the entire surface.

When the optical film of the present invention has the ¼ retardation of the wavelength, a Re (550) value of the first region included in the optical film and a Re (550) value of the second region included in the optical film are preferably from 30 nm to 250 nm, more preferably from 50 nm to 230 nm, particularly preferably from 100 nm to 200 nm, more particularly preferably from 105 nm to 180 nm, even more preferably from 115 nm to 160 nm, and more particularly preferably from 130 nm to 150 nm.

Further, during the 3D image display, the entire Re (550) of the pattern retardation layer and the support is preferably from 110 nm to 165 nm, more preferably from 110 nm to 155 nm, and even more preferably from 120 nm to 145 nm from the viewpoint that the polarization state of light passed through the first region and the second region may be switched from the linearly polarized light to the circularly polarized light or from the circularly polarized light to the linearly polarized light. In particular, it is preferred that the entire Re (550) of the pattern retardation layer and the support is within the range, and the slow axes of the first regions and the second regions are approximately perpendicular to each other from the viewpoint that the accuracy is good and the polarization state of an image for the right eye and an image for the left eye may be changed.

(Pattern Forming Method)

The first region and the second region may be formed by various methods. Hereinafter, examples of the method will be illustrated, but the present invention is not limited thereto.

[Pattern Exposure]

For patterning the retardation layer, pattern exposure may be performed.

The pattern exposure means that exposures which are different in mutual exposure conditions are performed on two or more regions of materials for manufacturing a birefringence pattern. At this time, "two or more regions" may or may not have a mutually overlapping site, but it is preferred that the regions do not have a mutually overlapping site. The pattern exposure may be a pattern exposure which produces only an exposed portion and an unexposed portion. In this case, a region on which a retardation is usually to be imposed is exposed. In addition, the pattern exposure may be a pattern exposure including an exposed portion produced by one or more exposure conditions, which is a middle tone of the unexposed portion and the exposed portion. The pattern exposure may be performed by one exposure, or may be performed by a plurality of exposures. For example, the pattern exposure may be performed by using one exposure using a mask which has two or more regions showing different transmission spectra by the region, or both may be combined.

The exposure condition is not particularly limited, but may include exposure peak wavelength, exposure illumination, exposure time, exposure value, temperature during exposure, atmosphere during exposure and the like. Among them, from the viewpoint of the ease of adjusting conditions, exposure peak wavelength, exposure illumination, exposure time and exposure value are preferred, and exposure illumination, exposure time and exposure value are more preferred. Then, the regions exposed under different exposure conditions during pattern exposure are subjected to baking, and thus, are different from each other, and show birefringence controlled by exposure conditions. In particular, a different amount of retardation is imparted. Furthermore, the exposure conditions between two or more exposure regions exposed under different exposure conditions may be discontinuously changed or continuously changed.

[Mask Exposure]

As a means for generating exposure regions which are different in exposure conditions, exposure using an exposure mask is useful. For example, exposure conditions of a previously exposed region and a later exposed region may be easily changed by performing exposure using an exposure mask to expose only one region, and then performing an exposure using separate masks by changing temperature, atmosphere, exposure illumination, exposure time and exposure wavelength, or performing an entire surface exposure. Furthermore, as a mask for changing exposure illumination or exposure wavelength, a mask having two or more regions which show different transmission spectra according to the region is particularly useful. In this case, by performing exposure only once, exposure may be performed on a plurality of regions at different exposure illuminations or exposure wavelengths. It is understood that different exposure values may be imparted by performing exposure at different exposure illuminations for the same time.

Further, when the scanning exposure using laser and the like is used, it is possible to change the exposure conditions for each region by a technique such as changing the intensity of a light source according to the exposure region and changing the scanning speed.

The technique of pattern exposure may be the contact exposure, the proximity exposure, the projection exposure and the like, and may be the direct drawing obtained by focusing laser, electronic beam or the like on a predetermined position without a mask. The irradiation wavelength of the light source of the exposure is preferably a peak wavelength of from 250 nm to 450 nm, and more preferably from 300 nm to 410 nm. When step heights are simultaneously formed by a photosensitive resin layer, it is preferred that light in a wavelength region that may cure the resin layer (for example, 365 nm, 405 nm and the like) is irradiated. Specifically, a super high pressure mercury lamp, a high pressure mercury lamp, a metal halide lamp, blue laser and the like may be used. A preferred exposure value is usually from 3 mJ/cm$^2$ to 2,000 mJ/cm$^2$, more preferably from 5 mJ/cm$^2$ to 1,000 mJ/cm$^2$, even more preferably from 10 mJ/cm$^2$ to 500 mJ/cm$^2$, and most preferably from 10 mJ/cm$^2$ to 100 mJ/cm$^2$.

[Heating (Bake)]

The patterning of a retardation amount is performed as a pattern according to the exposure condition during the pattern exposure by performing bake on the pattern exposed retardation layer at from 50° C. to 400° C. When the retardation dissipation temperature before the exposure of the retardation layer used and the retardation dissipation temperature after the exposure are assigned as T1 [° C.] and T2 [° C.] (when there is no retardation dissipation temperature at a temperature range of 250° C. or lower, T2=250° C.), the temperature during the bake is preferably from T1° C. to T2° C., more preferably from (T1+10)° C. to (T2−5)° C., and most preferably from (T1+20)° C. to (T2−10)° C.

In the case of using a retardation layer in which the retardation dissipation temperature is increasing, the retardation of the unexposed portion in the layer is reduced by the bake, by performing exposure while the reduction in retardation in the exposed portion is small or retardation is not reduced, or the retardation increases. As a result, the retardation in the unexposed portion is smaller than the retardation in the exposed portion, whether there is an axis or not is determined, or a pattern of the amount of retardation is prepared.

[Patterning in Axis Direction]

The method of patterning in an axis direction is not particularly limited, but as described above, a patterning in a direction of a light axis (slow axis) of the retardation layer may be performed preferably by using an orientation layer.

When a layer including a liquid crystalline compound provided on a light orientation layer, preferably a layer including a liquid crystalline compound directly provided on a light orientation layer, is irradiated by ultraviolet light, liquid crystal molecules are oriented in a polarized light direction of a polarized ultraviolet light on the light orientation layer prepared. Likewise, when a layer including a liquid crystalline compound provided on a rubbing orientation layer, preferably a layer including a liquid crystalline compound directly mounted on a rubbing orientation layer, is irradiated by ultraviolet light, liquid crystal molecules are oriented in a direction of rubbing.

Accordingly, when a pattern retardation layer is provided on a light orientation layer, a polarized light ultraviolet light is pattern irradiated by a technique which is the same as a technique of pattern exposure used during preparation of the above-described pattern retardation layer on a layer formed from a composition for forming a light orientation layer, thereby patterning the light orientation of the layer. A retardation layer with an axis direction patterned may be obtained by coating, drying and the like a composition containing a liquid crystalline compound on the light orientation layer obtained, and then irradiating ultraviolet light thereon. Likewise, when a pattern retardation layer is provided on a rubbing orientation layer, rubbing is performed through a mask and the like on a layer which is formed by a composition for forming a rubbing orientation layer prior to rubbing, thereby patterning a rubbing direction of the layer. A retardation layer with an axis direction patterned may be obtained by coating, drying and the like a composition containing a liquid crystalline compound on the light orientation layer obtained, and then irradiating ultraviolet light thereon.

(Preparation Method Using Transfer Materials)

The formation of the pattern retardation layer of the present invention may be performed by using transfer materials. The coating using organic solvents may be performed at a place different from a place where patterning materials are prepared by using transfer materials, and thus work and facility burdens when patterning materials are used are alleviated. Various transfer materials known in the art may be used, and transfer materials and the like described in, for example, paragraphs [0090] to [0097] of Japanese Patent Application Laid-Open No. 2009-223001 may be used.

[Formation of Optically Anisotropic Layer by Inkjet Method]

Next, embodiments in which the optically anisotropic layer is formed in any shape by using an inkjet will be described.

As the present embodiment, a fluid such as a solution in which a predetermined optically anisotropic property is expressed and the like is discharged by using an inkjet apparatus to form a layer consisting of the fluid in a micro region (for example, a transverse line of display pixels is a belt-like shape for every one line). The fluid preferably contains at least one of liquid crystalline compounds. Among them, the fluid preferably contains at least one of compounds represented by General Formula (I) or General Formula (II) of Japanese Patent Application Laid-Open No. 2007-270686. It is preferred that the fluid is prepared such that the liquid crystalline phase is formed after drying. The fluid may be discharged by inkjet, or may use a liquid dispersion in which a part or the whole of materials such as the liquid crystalline compound and the like are dispersed. However, the fluid is preferably a solution.

Also in the present aspect, the optically anisotropic layer may be formed on an orientation film. That is, an orientation film is previously formed, and then the fluid may be discharged in a micro region of the orientation film. An orientation film available in the present embodiment is the same as examples of the orientation film available in embodiments of the transfer method. A method for forming the orientation film is not particularly limited, but as the present embodiment, it is preferred that the orientation film is formed by the inkjet method in the same manner as in the formation of the optically anisotropic layer. After the discharge of the fluid is completed, the layer of the fluid is dried as desired to form a liquid crystalline phase and cured by exposing the layer, thereby forming an optically anisotropic layer. In order to form the liquid crystalline phase, the layer may be heated as desired. In this case, a heating apparatus may be used.

The fluid is preferably curable. That is, it is preferred that a curable composition is prepared into a fluid such as a solution and the like. For a polymerization initiator contained in the curable composition, various polymerization initiators described as embodiments of the transfer method may be used. Further, the fluid may contain an additive such as an orientation controlling agent and the like, and examples thereof are also in the same manner as examples of various additives described in embodiments of the transfer method. In addition, examples of the solvent used in the preparation of the fluid are also in the same manner as in examples of solvents available in the preparation of the coating liquid as embodiments of the transfer method.

Injection conditions of ink and the like when the optically anisotropic layer is formed are not particularly limited, but when the viscosity of a fluid for forming an optically anisotropic layer is high, it is preferred that ink is injected while reducing the viscosity of ink at room temperature or under heating (for example, from 20° C. to 70° C.) from the viewpoint of injection stability. The change in viscosity of ink and the like impose great influence on liquid drop size and liquid drop injection speed as it is, and thus deterioration in image quality is caused. Therefore, it is preferred that the temperature of ink and the like is maintained at a constant level as much as possible.

An inkjet head (hereinafter, simply referred to as head) used in the method is not particularly limited, and various inkjet heads known in the art may be used. Continuous type and dot-on-demand type inkjet heads are available. Among the dot-on-demand type heads, for discharge, a thermal head is preferably a type having an operation valve described in Japanese Patent Application Laid-Open No. 9-323420. As a piezo head, heads described in EP No. A277,703, EP No. A278,590 and the like may be used. It is preferred that the head has a temperature controlling function such that temperature may be managed. It is preferred that the injection temperature is set in order to have an viscosity of from 5 mPa to 25 mPa when the fluid is injected and the fluid temperature is controlled to maintain a variation width of the viscosity within ±5%. Furthermore, the driving frequency is preferably from 1 kHz to 500 kHz.

The optical film of the present invention is appropriate for use in particularly a large screen liquid crystal display device. When an optical film is used for a liquid crystal display device for a large screen, it is preferred that a film width is molded into, for example, 1,470 mm or more. In addition, the optical film of the present invention includes a film as an aspect of a film piece cut into a size capable of being incorporated into a liquid crystal display device as it is as well as a film having an aspect of a film manufactured into a long shape and wound up as a roll type. The optical film in the latter aspect is cut into a desired size and used when the film is stored and conveyed as it is and then actually incorporated into a liquid crystal display or adhered to a polarizer and the like. Furthermore, likewise, the film is adhered as a long shape to a polarizer consisting of a polyvinyl alcohol film and the like prepared into a long shape, and then is cut into a desired size and used when actually incorporated into a liquid crystal display device. As an aspect of the optical film wound up as a roll type, as an aspect in which the optical film is wound up into a roll type with a roll length of 2,500 m or more may be used.

[Polarizing Plate]

In a polarizing plate of the present invention, at least one sheet of the optical film of the present invention is laminated.

The polarizing plate may include a polarizing plate having a typical configuration known in the related art, and as a specific configuration of the polarizing plate, a known configuration may be adopted without any particular limitation. However, for example, a configuration in FIG. 6 of Japanese Patent Application Laid-Open No. 2008-262161 may be adopted. The optical film of the present invention may be prepared into a pattern retardation film which may be laminated on a surface on one side of a typical polarizing plate and used in a 3D stereoscopic image display system of a polarizing glasses mode. An aspect of the polarizing plate includes a polarizing plate having an aspect of a film piece cut into a size capable of being incorporated into a liquid crystal display device as it is as well as a polarizing plate having an aspect of a belt-like shape, that is, a film manufactured as a long shape by a continuous production and wound up into a roll type (for example, an aspect with a roll length of 2,500 m or more or 3900 m or more). As described above, it is preferred that the width of a polarizing plate is maintained at 1470 mm or more in order to be applied to a large screen liquid crystal display device.

[Adhesive Layer]

In the polarizing plate of the present invention, an optical film and a polarizer may be laminated through an adhesive layer.

In the present invention, an adhesive layer used for lamination of an optical film and a polarizer refers to, for example, a material with a ratio of G' and G" (tanδ=G"/G') of from 0.001 to 1.5, and includes an adhesive, a material susceptible to creep, and the like.

[Image Display Panel]

An image display panel of the present invention includes at least one sheet of the optical film of the present invention. Accordingly, among lights in the image display panel, the polarization state of light passed through the first region and light passed through the second region may be switched, thereby obtaining an image display panel capable of displaying a 3D stereoscopic image display.

An image display panel used in an image display device of the present invention is not particularly limited, and may be a CRT or a flat panel display. However, a flat panel display is preferred. As the flat panel display, PDP, LCD, organic ELD and the like may be used, but the present invention may be particularly preferably applied when the image display panel is a liquid crystal display panel. Among flat panel displays, a high quality and inexpensive image display system may be obtained by manufacturing the image display panel as a liquid crystal display panel.

In a liquid crystal display device having a liquid crystal cell and a pair of polarizing plates disposed at both sides of the liquid crystal cell, the liquid crystal display device is preferably a liquid crystal display of IPS, OCB or VA mode, in which at least one side of the polarizing plate is the polarizing plate of the present invention.

A specific configuration of the liquid crystal display device is not particularly limited, but a known configuration may be adopted. Further, the configuration of FIG. 2 in Japanese Patent Application Laid-Open No. 2008-262161 may also be preferably adopted.

[Image Display System]

The image display system of the present invention includes at least one sheet of the optical film of the present invention. Accordingly, an image for the left eye and an image for the right eye are input into an image display panel, the image for the left eye and the image for the right eye are projected from an image display panel toward the optical film of the present invention, and the polarization states of the image for the left eye (or image for the right eye) passed through the first region of the optical film of the present invention and the image for the right eye (or image for the left eye) passed through the second region may be switched. It is possible to obtain an image display system, through which an image for the left eye and an image for the right eye may be incident only on the left eye and the right eye, respectively, and a 3D stereoscopic image display may be observed, by using a pair of polarization glasses including a lens for the left eye including a polarizing plate which transmits only the image for the left eye passed through the first region and a lens for the right eye including a polarizing plate which transmits only the image for the right eye passed through the second region in combination.

The image display system is described in U.S. Pat. No. 5,327,285. Further, examples of the polarization glasses are described in Japanese Patent Application Laid-Open No. 10-232365.

In addition, a pattern retardation film in a commercially available image display system may be peeled off and then switched with the optical film of the present invention.

In the present invention, a preferred image display system may include the following liquid crystal display device. That is, the liquid crystal display device as shown in FIG. 1, is a liquid crystal display device including: a pair of substrates having an electrode on at least one side thereof and disposed to face each other, a liquid crystal layer between the pair of substrates, a polarizer disposed to interpose the liquid crystal layer therebetween, a protective film installed at least on an external side of the polarizer, a first polarizing plate disposed on the side of a light source and a second polarizing plate disposed on the side of visual recognition, in which images are visually recognized through a third polarizing plate having the polarizer and at least one sheet of the protective film on the side of visual recognition of the second polarizing plate, and a liquid crystal display device using a polarizing plate having the optical film of the present invention as the second polarizing plate. The optical film of the present invention use a support having a small change in size according to the change in temperature, and thus a good 3D display performance may be obtained without a crosstalk even after time has elapsed.

EXAMPLE

Hereinafter, the present invention will be described in more detail with reference to Examples. Materials, reagents, material amounts and proportions thereof, operations and the like shown in the following Examples may be appropriately changed as long as the spirit of the present invention is not deviated therefrom. Accordingly, the scope of the present invention is not limited to the following specific Examples.

[Preparation Example of Support Film]

(Support Film 1)

A dope is prepared by introducing 100 parts by mass of a cellulose acetate having a degree of substitution of 2.86 (the viscosity average polymerization degree is 300, the degree of substitution of acetyl groups at 6-position is 0.89, the acetone extraction portion is 7% by mass, the molecular weight ratio of mass average molecular weight/number average molecular weight is 2.3, the water content is 0.2% by mass, the viscosity in a 6 mass % dichloromethane solution is 305 mPa·s, the residual acetic acid amount is 0.1% by mass or less, the Ca content is 65 ppm, the Mg content is 26 ppm, the iron content is 0.8 ppm, the sulfuric acid ion content is 18 ppm, the yellow index is 1.9, and the free acetic acid amount is 47 ppm of a powder (the average particle size of the powder is 1.5 mm, the standard deviation is 0.5 mm)), 40 parts by mass of PP-40, 0.1 parts by mass of a silica particle (Aerosol R972, manufactured by Nippon Aerosil Co., Ltd.) and a solvent (methylene chloride, methanol and 1-butanol (mass ratio 81:18:1). The water content of each solvent is 0.2% by mass) into a mixing tank and stirring the resulting mixture while heating to dissolve each component. Further, the dope is prepared such that the solid content concentration (the total concentration of the cellulose acylate, the additive and the silica particle in the dope) in the amount of the solvent is 25% by mass. The cellulose acylate solution obtained is filtered by a filter paper (#63, manufactured by Toyo Roshi Co., Ltd.) having an absolute filtration accuracy of 10 μm, and further filtered by a metal sintered filter (FH025, manufactured by Pall Corp.) having an absolute filtration accuracy of 2.5 μm to obtain a polymer solution. The dope solution obtained is cast on a mirror surface stainless steel support which is a drum having a diameter of 3 m and cooled to −5° C. from a casting nozzle. The film is peeled while the solution content is approximately 70% by mass, both edges of the film in a width direction are fixed with pin tenters (pin tenters of FIG. 3 in Japanese Patent Application Laid-Open No. H4-1009), and the film was dried while the solution content is approximately from 3% by mass to 5% by mass and the intervals of the tenters were maintained such that the stretching ratio in the transverse direction (direction perpendicular to the machine direction) is about 3%. Next, the film is further dried by conveying the film between rolls of a heat treatment apparatus, thereby preparing a transparent film support 1 having a thickness of 60 μm for use as a support.

(Support Film 2)

A film is prepared from the following composition with reference to the preparation of the "optical film (1)" in Examples of WO2009/047924, and used as a support.

(Composition for Support Film 2)

DIANAL BR85 (manufactured by Mitsubishi Rayon Co., Ltd.) 70 parts by mass Cellulose ester 30 parts by mass (Cellulose acetate Propionate, total degree of acyl group substitution of 2.75, degree of acetyl group substitution of 0.19, degree of propionyl group substitution of 2.56, Mw=200,000)

Methylene chloride 300 parts by mass
Ethanol 40 parts by mass (Support Film 3)

T 80 UZ manufactured by Fuji Film Co., Ltd. is stretched with reference to Example 110 in Japanese Patent Application Laid-Open No. 2007-176164 (the following stretching 1), and then used as a support.

(Support Film 4)

T 80 UZ manufactured by Fuji Film Co., Ltd. is stretched with reference to Example 110 in Japanese Patent Application Laid-Open No. 2007-176164 (the following stretching 2), and then used as a support.

(Support Film 5)

The support film 1 is stretched (the following stretching 1), and then used as a support.

(Support Film 6)

The support film 2 is stretched (the following stretching 1), and then used as a support.

(Support Film 21)

"ARTON (manufactured by JSR Corp.)" is used as a support.

(Support Film 22) "ZF14 (manufactured by Nippon ZEON Corp.)" is used as a support.

[Stretching of Support Film]

(Stretching 1) For Films 3, 5 and 6 among the films prepared above, stretching is performed in a conveying direction by using an apparatus having a heating zone adjusted to a temperature described in Table 1 between two nip rolls. The stretching magnification is controlled to obtain a value described in Table 1 by adjusting the peripheral speed (tip speed) of the nip roll, and adjusted such that the aspect ratio (distance between nip rolls/base width) is 3.3. After the stretching, the film is cooled and wound up. The stretching magnification is shown in the following Table 1.

(Stretching 2)

Among the films prepared, Film 4 is stretched in a width direction by using a tenter. The stretching magnification and heating temperature are controlled so as to be values in Table 1.

For Films 1 to 6, 21 and 22, the performance of the films is shown in the following Table 1. Furthermore, for Films 3 to 6, the slow axis direction is perpendicular to the maximum sound velocity direction.

TABLE 1

| Kind of support film | | Moisture permeability [%] | Stretching temperature [° C.] | Stretching magnification [%] | Maximum sound velocity azimuth [°] | Elastic modulus [GPa] | Re [nm] | Rth [nm] | Coefficient of thermal expansion [ppm/° C.] | Humidity expansion coefficient [ppm/% rh] | Change in dimension [%] |
|---|---|---|---|---|---|---|---|---|---|---|---|
| Support film 1 | Example | 3.2 | — | — | — | 2.0 | 0 | −6 | 54 | 43 | 0.0 |
| Support film 2 | Example | 1.7 | — | — | — | 2.7 | 0 | 2 | 87 | 91 | 0.1 |
| Support film 3 | Example | 2.8 | 180 | 73 | 0 | 7.5 | 2 | 5 | 14 | 19 | 0.0 |
| Support film 4 | Example | 2.8 | 180 | 73 | 90 | 7.5 | 2 | 5 | 14 | 19 | 0.0 |
| Support film 5 | Example | 3.0 | 160 | 50 | 0 | 3.4 | 2 | −3 | 30 | 22 | 0.0 |

TABLE 1-continued

| Kind of support film | | Moisture permeability [%] | Stretching temperature [° C.] | Stretching magnification [%] | Maximum sound velocity azimuth [°] | Elastic modulus [GPa] | Re [nm] | Rth [nm] | Coefficient of thermal expansion [ppm/° C.] | Humidity expansion coefficient [ppm/% rh] | Change in dimension [%] |
|---|---|---|---|---|---|---|---|---|---|---|---|
| Support film 6 | Example | 1.7 | 145 | 60 | 0 | 3.5 | 1 | 3 | 24 | 24 | 0.0 |
| Support film 21 | Comparative Example | 0.2 | — | — | 0 | 2.2 | 5 | 42 | 81 | 5 | 0.3 |
| Support film 22 | Comparative Example | 0.0 | — | — | 0 | 2.1 | 5 | 6 | 76 | 0 | 0.3 |

The maximum sound velocity azimuth, elastic modulus (E1), Re, Rth, coefficient of thermal expansion (α) and humidity expansion coefficient (β) shown in Table 1 are measured by the above-described method. Herein, Re and Rth are values at a wavelength of 550 nm. Further, for the maximum sound velocity azimuth, the conveying direction is set at 0° when the support is manufactured. For the elastic modulus (E1), coefficient of thermal expansion (α) and humidity expansion coefficient (β), measured values in the maximum sound velocity azimuth are shown.

For the change in dimension, during heating at 60° C. in a room at 25° C. and 60% RH, the size change (=((size after heating)−(size before heating))/(size before heating)×100 (%)) is shown.

For Support Films 1 and 2, the maximum sound velocity azimuth may not be defined. For this reason, "-" is described in the column of the maximum sound velocity azimuth of Table 1. Further, the films are not stretched and thus "-" is described in the columns of the stretching temperature and stretching magnification.

In addition, for Support Films 21 and 22, the stretching temperature and stretching magnification of the commercially available films are not clear and thus "-" is described in these columns of Table 1.

[Preparation of Retardation Film]

Referring to "Site 2" and "Site 5" in Example 1 of Japanese Patent Application Laid-Open No. 2009-223001, a pattern retardation layer A is patterned such that a site (a first region) with the direction of the slow axis making an angle of 45° with the direction of the long side of the pattern and a site (a second region) with the direction of the slow axis making an angle of 135° with the direction of the long side are repeated with a period of 300 μm, and the retardation layer A is prepared on a glass substrate. This is transferred to the above-prepared support film shown in Table 2, thereby preparing Retardation Films 1 to 5 and 12 to 15 having the pattern retardation layer A.

Furthermore, the films obtained after the support films 3 and 5 are punched such that the direction of the long side of the film and the maximum sound velocity azimuth are crossing at 80°, and then the above-described pattern retardation layer A is transferred such that the direction of the long side of the pattern is parallel to the direction of the long side of the support film, thereby preparing Pattern Retardation Films 16 and 18.

Further, in the preparation of the above-described pattern retardation layer A, a pattern retardation layer B is patterned such that a site (a first region) with the direction of the slow axis making an angle of 35° with the direction of the long side of the pattern and a site (a second region) with the direction of the slow axis making an angle of 125° with the direction of the long side are repeated with a period of 300 μm, and the pattern retardation layer B is transferred on Support Films 3 and 5, thereby preparing Pattern Retardation Films 17 and 19.

Retardation Films 1 to 5 and 12 to 19 prepared as described above are incorporated and shown in the following Table 2. In Table 2, the pattern long axis azimuth represents an angle between the maximum sound velocity azimuth of the support film and the pattern long axis direction (direction of the long side of the pattern), and the first region slow axis azimuth and the second region slow axis azimuth represent an angle between the maximum sound velocity azimuth and the slow axis, respectively.

For Retardation Films 1 to 5 and 12 to 19, the following evaluation is performed.

(Preparation of 3D Monitor)

A front polarizing plate HPL02065 (manufactured by HP Inc.) is peeled off, and a polarizing plate using each of the films in Examples and Comparative Examples as a protective film is affixed.

(Evaluation of Crosstalk)

The 3D monitor prepared above is lit for 48 hr continuously, then pixels for the right eye and pixels for the left eye are marked with a white pattern and a black pattern, respectively, a spectral radiance luminance meter (SR-3 manufactured by TOPCON Corp.) is placed at a position of eyes, and the luminance intensity is measured through each of circularly polarized light glasses for the right eye/left eye.

The luminance intensity of light transmitted through the circularly polarized light glasses for the right eye refers to Y RR and the luminance intensity of light transmitted through the circularly polarized light glasses for the left eye refers to Y RL.

When an image for the right eye enters the left eye and an image for the left eye enters the right eye, the 3D feeling is lost and thus, the degree of crosstalk is defined as CRO=(YRR−YRL)/(YRR+YRL) and evaluation is performed. The CRO immediately after the monitor is lit is defined as CRO 0 and the CRO after the monitor is lit for 48 hr is defined as CRO 48, evaluation is performed in accordance with the following criteria based on the value of 100*CRO_48/CRO_0.

A: 95% or more

B: 92.5% from less than 95%

C: 90% or more and less than 92.5%

D: less than 90%

"A" is most preferred, "B" is next preferred and "C" is next less preferred.

In addition, for CRO_0, all the retardation films are 0.15 or less, and Retardation Films 1 to 5 and 12 to 15 are 0.08 or less.

The result is shown in the following Table 2. From the result in Table 2, it is apparent that the optical film of the present invention is effective for alleviation of the crosstalk when the 3D display is continuously lit. This is thought to be due to the suppression of size change of the support with lapse of time.

TABLE 2

| | | Pattern Kind of support | long axis azimuth [°] | First region in total Re(550) [nm] | Slow axis azimuth [°] | Second region in total Re(550) [nm] | Slow axis azimuth [°] | Crosstalk evaluation |
|---|---|---|---|---|---|---|---|---|
| Retardation film 1 | Example | Support film 3 | 90 | 137.1 | 44.6 | 137.1 | 135.4 | A |
| Retardation film 2 | Example | Support film 3 | 0 | 137.1 | 44.7 | 137.1 | 135.3 | C |
| Retardation film 3 | Example | Support film 5 | 90 | 137.1 | 44.6 | 137.1 | 135.4 | B |
| Retardation film 4 | Example | Support film 6 | 0 | 137.1 | 44.9 | 135.1 | 135 | C |
| Retardation film 5 | Comparative Example | Support film 21 | 90 | 137.2 | 44.1 | 137.2 | 135.9 | D |
| Retardation film 12 | Example | Support film 1 | 90 | 137 | 45 | 137 | 135 | C |
| Retardation film 13 | Example | Support film 2 | 90 | 137 | 45 | 137 | 135 | C |
| Retardation film 14 | Comparative Example | Support film 22 | 90 | 137.2 | 44.1 | 137.2 | 135.9 | D |
| Retardation film 15 | Example | Support film 4 | 90 | 137.1 | 44.7 | 137.1 | 135.3 | A |
| Retardation film 16 | Example | Support film 3 | 80 | 137.8 | 44.7 | 137.8 | 135.3 | A |
| Retardation film 17 | Example | Support film 3 | 90 | 136.4 | 35.4 | 136.3 | 124.7 | A |
| Retardation film 18 | Example | Support film 5 | 80 | 137.8 | 44.7 | 137.8 | 135.3 | B |
| Retardation film 19 | Example | Support film 5 | 90 | 136.4 | 35.4 | 136.3 | 124.7 | B |

INDUSTRIAL APPLICABILITY

According to the present invention, it is possible to provide a 3D switchable image display panel in which the occurrence of crosstalk is suppressed.

The present invention has been described in detail with reference to specific embodiments, but it is apparent to those skilled in the art that various changes and modifications may be made without departing from he spirit and scope of the present invention.

The present application is based on Japanese Patent Application (Patent Application No. 2010-035462) filed on Feb. 19, 2010, the contents of which are incorporated herein by reference.

The invention claimed is:

1. An optical film comprising:
a support containing a polymer having a moisture absorptivity of 0.5% or more; and
an optically anisotropic layer including a first retardation region and a second retardation region that have different birefringence from each other and that are alternately patterned for every one line,
wherein a direction of a long side of the pattern is approximately perpendicular to a direction in which a sound velocity of only the support is the maximum.

2. The optical film according to claim 1, wherein the polymer is a polymer having a chemical structure selected from a hydroxyl group, amide, imide and ester in a main chain or side chain thereof.

3. The optical film according to claim 1, wherein the polymer is cellulose ester.

4. The optical film according to claim 1, wherein a coefficient of thermal expansion α ranges from $5.0 \times 10^{-6}$/° C. to $500 \times 10^{-6}$/° C. and a humidity expansion coefficient β ranges from $3.0 \times 10^{-6}$/% RH to $500 \times 10^{-6}$/% RH, in a direction parallel to a direction in which a sound velocity of the support is the maximum.

5. The optical film according to claim 4, wherein an elastic modulus (E1) of the direction in which the sound velocity is the maximum ranges from 5 GPa to 50 GPa.

6. The optical film according to claim 1, wherein the support is stretched by 10% or more.

7. The optical film according to claim 6, wherein the support is a support in which a stretching in a conveying direction, a stretching in a direction which does not match the conveying direction, or a stretching in combination thereof is performed.

8. The optical film of claim 1, wherein the support satisfies the following equation (I):

$$|Re(550)| < 5 \text{ and } |Rth(550)| < 20 \qquad \text{Equation (I)}$$

wherein Re (λ) and Rth (λ) represent retardation values (unit: nm) in an in-plane direction and a film thickness direction at a wavelength of λ (unit: nm), respectively.

9. The optical film according to claim 1, wherein an entire Re (550) of the patterned optically anisotropic layer and the support ranges from 110 nm to 165 nm, and a slow axis of the first retardation region is approximately perpendicular to a slow axis of the second retardation region.

10. A polarizing plate comprising:
an optical film according to claim 1; and
a polarizer,
wherein the optical film and the polarizer are stacked through an adhesive layer.

11. A liquid crystal display device comprising:
a pair of substrates having an electrode on at least one side thereof and disposed to face each other;
a liquid crystal layer between the pair of substrates; and
a first polarizing plate disposed on the side of a light source and a second polarizing plate disposed on a side of visual which interpose the liquid crystal layer therebetween, each including a polarizer and a protective film provided at least on an external side of the polarizer, a protective film provided at least on an external side of the polarizer, an image being visually recognized through a third polarizing plate that includes a polarizer and at least one protective film on the visual side of the second polarizing plate, wherein a polarizing plate according to claim 10 is the second polarizing plate.

\* \* \* \* \*